United States Patent
Yang et al.

(10) Patent No.: US 9,814,036 B2
(45) Date of Patent: Nov. 7, 2017

(54) LOGICAL TONE INDEX MAPPING FOR DISTRIBUTED TONE INDEX TRANSMISSION

(71) Applicant: QUALCOMM Incorporated, San Diego, CA (US)

(72) Inventors: Lin Yang, San Diego, CA (US); Bin Tian, San Diego, CA (US); Jialing Li Chen, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 87 days.

(21) Appl. No.: 14/854,985

(22) Filed: Sep. 15, 2015

(65) Prior Publication Data
US 2016/0088599 A1   Mar. 24, 2016

Related U.S. Application Data

(60) Provisional application No. 62/052,432, filed on Sep. 18, 2014.

(51) Int. Cl.
*H04W 72/04* (2009.01)
*H04L 5/00* (2006.01)

(52) U.S. Cl.
CPC ......... *H04W 72/044* (2013.01); *H04L 5/0041* (2013.01); *H04L 5/0007* (2013.01); *H04L 5/0044* (2013.01)

(58) Field of Classification Search
CPC ....... H04L 5/00; H04L 5/0007; H04L 5/0041; H04L 5/0044; H04L 5/004; H04W 72/04; H04W 72/044; H04W 72/04333
See application file for complete search history.

(56) References Cited

U.S. PATENT DOCUMENTS

| | | | | |
|---|---|---|---|---|
| 7,715,845 | B2* | 5/2010 | Jin | H04B 1/713 455/447 |
| 8,625,498 | B2* | 1/2014 | Bourlas | H04L 5/023 370/328 |
| 8,638,761 | B2* | 1/2014 | Taghavi Nasrabadi | H04L 1/0606 370/335 |
| 9,407,406 | B2* | 8/2016 | Srinivasa | H04L 1/0057 |
| 2007/0064730 | A1* | 3/2007 | Jin | H04B 1/713 370/468 |
| 2008/0176577 | A1 | 7/2008 | Bourlas et al. | |

(Continued)

OTHER PUBLICATIONS

International Search Report and Written Opinion—PCT/US2015/050498—ISA/EPO—Mar. 21, 2016.

(Continued)

*Primary Examiner* — Tri H Phan
(74) *Attorney, Agent, or Firm* — Arent Fox LLP

(57) ABSTRACT

A method, an apparatus, and a computer program product for wireless communication are provided. In one aspect, an apparatus includes a processor configured to allocate a plurality of resource blocks for wireless communication. The processor is further configured to transmit data on a first resource block of the plurality of resource blocks, in which the first resource block is associated with a first set of tone indices and a second set of tone indices, and the first set of tone indices is a set of nominal tone indices that is logically mapped to a second set of tone indices that is a set of physical tone indices.

26 Claims, 14 Drawing Sheets

(56) References Cited

U.S. PATENT DOCUMENTS

| | | | |
|---|---|---|---|
| 2009/0262696 A1* | 10/2009 | Wei | H04L 5/0044 370/329 |
| 2012/0051447 A1* | 3/2012 | Qi | H04L 1/0009 375/259 |
| 2012/0087436 A1 | 4/2012 | Srinivasa et al. | |
| 2012/0134430 A1* | 5/2012 | Li | H04L 5/006 375/260 |
| 2012/0327868 A1* | 12/2012 | Taghavi Nasrabadi | H04L 1/0606 370/329 |
| 2014/0177756 A1* | 6/2014 | Park | H04L 27/3405 375/298 |
| 2016/0073379 A1* | 3/2016 | Yang | H04W 28/20 370/329 |
| 2016/0073409 A1* | 3/2016 | Chen | H04L 5/0037 370/329 |
| 2016/0080043 A1* | 3/2016 | Tian | H04B 7/022 375/267 |
| 2016/0165482 A1* | 6/2016 | Yang | H04L 27/2613 370/336 |

OTHER PUBLICATIONS

Sesia S., et al., "LTE—The UMTS Long Term Evolution" In: "LTE—The UMTS Long Term Evolution", John Wiley & Sons John Wiley & Sons, Nov. 1, 2011 (Nov. 1, 2011), vol. 27, XP055232065, pp. 318-321.

Shao H-R., et al., "Sp1 Comment resolutions; 15-09-0395-00-003c-sp1-comment-resolutions," Samsung Electronics, IEEE Draft; 15-09-0395-00-003C-Sp1-Comment-Resolutions, IEEE-SA Mentor, Piscataway, NJ USA, val. 802.153c, May 12, 2009 (May 12, 2009), pp. 1-9, XP017666808.

Yang S-K., et al., "IEEE 802.15.3c Audio Video OFDM" In: "69GHz Technology for Gbps WLAN and WPAN: From Theory to Practice", John Wiley & Sons John Wiley & Sons, Nov. 1, 2010 (Nov. 1, 2010), vol. 27, XP055231962, pp. 126-135.

* cited by examiner

600 →

| Column 1 | Column 2 | Column 3 | Column 4 | Column 5 |
|---|---|---|---|---|
| Nominal Tone Index | Index | Bit | Reverse | Distributed (or Physical) Tone Index |
|  | 0 | ~~000~~ | ~~000~~ | ~~0~~ |
| 1 | 1 | ~~001~~ | ~~100~~ | 4 |
| 2 | 2 | 010 | 010 | 2 |
| 3 | 3 | 011 | 110 | 6 |
| 4 | 4 | 100 | 001 | 1 |
| 5 | 5 | 101 | 101 | 5 |
| 6 | 6 | ~~110~~ | ~~011~~ | ~~3~~ |
| 7 | 7 | 111 | 111 | 7 | deleted mapping valid mapping deleted mapping valid mapping

FIG. 6

Interleaver Matrix for a 20 Mhz 4x Symbol

700 →

| 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|---|---|---|---|---|---|---|---|---|---|
| 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 |
| 75 | 76 | 77 | 78 | 79 | 80 | 81 | 82 | 83 | 84 | 85 | 86 | 87 | 88 | 89 | 90 | 91 | 92 | 93 | 94 | 95 | 96 | 97 | 98 | 99 | 100 | 101 | 102 | 103 | 104 | 105 | 106 |
| 107 | 108 | 109 | 110 | 111 | 112 | 113 | 114 | 115 | 116 | 117 | 118 | 119 | 120 | 121 | 122 | 134 | 135 | 136 | 137 | 138 | 139 | 140 | 141 | 142 | 143 | 144 | 145 | 146 | 147 | 148 | 149 |
| 150 | 151 | 152 | 153 | 154 | 155 | 156 | 157 | 158 | 159 | 160 | 161 | 162 | 163 | 164 | 165 | 166 | 167 | 168 | 169 | 170 | 171 | 172 | 173 | 174 | 175 | 176 | 177 | 178 | 179 | 180 | 181 |
| 182 | 183 | 184 | 185 | 186 | 187 | 188 | 189 | 190 | 191 | 192 | 193 | 194 | 195 | 196 | 197 | 198 | 199 | 200 | 201 | 202 | 203 | 204 | 205 | 206 | 207 | 208 | 209 | 210 | 211 | 212 | 213 |
| 214 | 215 | 216 | 217 | 218 | 219 | 220 | 221 | 222 | 223 | 224 | 225 | 226 | 227 | 228 | 229 | 230 | 231 | 232 | 233 | 234 | 235 | 236 | 237 | 238 | 239 | 240 | 241 | 242 | 243 | 244 | 245 |

750 →

AP Allocated TAU1 – Associated with a Set of Nominal Tone Indices Logically Mapped to a Set of Physical Tone Indices

AP

| Nom | 11 | 12 | 13 | 14 | 15 | 16 | 17 | 18 | 19 | 20 | 21 | 22 | 23 | 24 | 25 | 26 | 27 | 28 | 29 | 30 | 31 | 32 | 33 | 34 | 35 | 36 | 37 | 38 | 39 | 40 | 41 | 42 |
|---|---|---|---|---|---|---|---|---|---|---|---|---|---|---|---|---|---|---|---|---|---|---|---|---|---|---|---|---|---|---|---|---|
| Phy | 11 | 18 | 25 | 32 | 39 | 46 | 53 | 60 | 67 | 74 | 81 | 88 | 95 | 102 | 109 | 116 | 134 | 141 | 148 | 155 | 162 | 169 | 176 | 183 | 190 | 197 | 204 | 211 | 218 | 225 | 232 | 239 |

780 →

STA Allocated TAU2 – Associated with a Set of Nominal Tone Indices Logically Mapped to a Set of Physical Tone Indices

STA

| Nom | 43 | 44 | 45 | 46 | 47 | 48 | 49 | 50 | 51 | 52 | 53 | 54 | 55 | 56 | 57 | 58 | 59 | 60 | 61 | 62 | 63 | 64 | 65 | 66 | 67 | 68 | 69 | 70 | 71 | 72 | 73 | 74 |
|---|---|---|---|---|---|---|---|---|---|---|---|---|---|---|---|---|---|---|---|---|---|---|---|---|---|---|---|---|---|---|---|---|
| Phy | 12 | 19 | 26 | 33 | 40 | 47 | 54 | 61 | 68 | 75 | 82 | 89 | 96 | 106 | 113 | 120 | 127 | 134 | 141 | 148 | 155 | 162 | 169 | 176 | 183 | 190 | 197 | 203 | 210 | 217 | 224 | 231 |

| Nominal | TAU1 i | Interm. | Physical |
|---|---|---|---|
| 11 | 0 | 0 | 11 |
| 12 | 1 | 7 | 18 |
| 13 | 2 | 14 | 25 |
| 14 | 3 | 21 | 32 |
| 15 | 4 | 28 | 39 |
| 16 | 5 | 35 | 46 |
| 17 | 6 | 42 | 53 |
| 18 | 7 | 49 | 60 |
| 19 | 8 | 56 | 67 |
| 20 | 9 | 63 | 74 |
| 21 | 10 | 70 | 81 |
| 22 | 11 | 77 | 88 |
| 23 | 12 | 84 | 95 |
| 24 | 13 | 91 | 102 |
| 25 | 14 | 98 | 109 |
| 26 | 15 | 105 | 116 |
| 27 | 16 | 112 | 134 |
| 28 | 17 | 119 | 141 |
| 29 | 18 | 126 | 148 |
| 30 | 19 | 133 | 155 |
| 31 | 20 | 140 | 162 |
| 32 | 21 | 147 | 169 |
| 33 | 22 | 154 | 176 |
| 34 | 23 | 161 | 183 |
| 35 | 24 | 168 | 190 |
| 36 | 25 | 175 | 197 |
| 37 | 26 | 182 | 204 |
| 38 | 27 | 189 | 211 |
| 39 | 28 | 196 | 218 |
| 40 | 29 | 203 | 225 |
| 41 | 30 | 210 | 232 |
| 42 | 31 | 217 | 239 |

830 →

Dm=7
k=1

| Nominal | TAU2 i | Interm. | Physical |
|---|---|---|---|
| 43 | 0 | 1 | 12 |
| 44 | 1 | 8 | 19 |
| 45 | 2 | 15 | 26 |
| 46 | 3 | 22 | 33 |
| 47 | 4 | 29 | 40 |
| 48 | 5 | 36 | 47 |
| 49 | 6 | 43 | 54 |
| 50 | 7 | 50 | 61 |
| 51 | 8 | 57 | 68 |
| 52 | 9 | 64 | 75 |
| 53 | 10 | 71 | 82 |
| 54 | 11 | 78 | 89 |
| 55 | 12 | 85 | 96 |
| 56 | 13 | 92 | 103 |
| 57 | 14 | 99 | 110 |
| 58 | 15 | 106 | 117 |
| 59 | 16 | 113 | 135 |
| 60 | 17 | 120 | 142 |
| 61 | 18 | 127 | 149 |
| 62 | 19 | 134 | 156 |
| 63 | 20 | 141 | 163 |
| 64 | 21 | 148 | 170 |
| 65 | 22 | 155 | 177 |
| 66 | 23 | 162 | 184 |
| 67 | 24 | 169 | 191 |
| 68 | 25 | 176 | 198 |
| 69 | 26 | 183 | 205 |
| 70 | 27 | 190 | 212 |
| 71 | 28 | 197 | 219 |
| 72 | 29 | 204 | 226 |
| 73 | 30 | 211 | 233 |
| 74 | 31 | 218 | 240 |

860 →

Dm=7
k=6

| Nominal | TAU7 i | Interm. | Physical |
|---|---|---|---|
| 107 | 0 | 6 | 17 |
| 108 | 1 | 13 | 24 |
| 109 | 2 | 20 | 31 |
| 110 | 3 | 27 | 38 |
| 111 | 4 | 34 | 45 |
| 112 | 5 | 41 | 52 |
| 113 | 6 | 48 | 59 |
| 114 | 7 | 55 | 66 |
| 115 | 8 | 62 | 73 |
| 116 | 9 | 69 | 80 |
| 117 | 10 | 76 | 87 |
| 118 | 11 | 83 | 94 |
| 119 | 12 | 90 | 101 |
| 120 | 13 | 97 | 108 |
| 121 | 14 | 104 | 115 |
| 122 | 15 | 111 | 122 |
| 134 | 16 | 118 | 140 |
| 135 | 17 | 125 | 147 |
| 136 | 18 | 132 | 154 |
| 137 | 19 | 139 | 161 |
| 138 | 20 | 146 | 168 |
| 139 | 21 | 153 | 175 |
| 140 | 22 | 160 | 182 |
| 141 | 23 | 167 | 189 |
| 142 | 24 | 174 | 196 |
| 143 | 25 | 181 | 203 |
| 144 | 26 | 188 | 210 |
| 145 | 27 | 195 | 217 |
| 146 | 28 | 202 | 224 |
| 147 | 29 | 209 | 231 |
| 148 | 30 | 216 | 238 |
| 149 | 31 | 223 | 245 |

US 9,814,036 B2

LOGICAL TONE INDEX MAPPING FOR DISTRIBUTED TONE INDEX TRANSMISSION

CROSS-REFERENCE TO RELATED APPLICATION(S)

This application claims the benefit of U.S. Provisional Application Ser. No. 62/052,432, entitled "Logical Tone Index Mapping for Distributed Tone Index Transmission" and filed on Sep. 18, 2014, which is expressly incorporated by reference herein in its entirety.

BACKGROUND

Field

The present disclosure relates generally to communication systems, and more particularly, to logical tone index mapping for distributed tone index transmission.

Background

In many telecommunication systems, communications networks are used to exchange messages among several interacting spatially-separated devices. Networks may be classified according to geographic scope, which could be, for example, a metropolitan area, a local area, or a personal area. Such networks would be designated respectively as a wide area network (WAN), metropolitan area network (MAN), local area network (LAN), wireless local area network (WLAN), or personal area network (PAN). Networks also differ according to the switching/routing technique used to interconnect the various network nodes and devices (e.g., circuit switching vs. packet switching), the type of physical media employed for transmission (e.g., wired vs. wireless), and the set of communication protocols used (e.g., Internet protocol suite, Synchronous Optical Networking (SONET), Ethernet, etc.).

Wireless networks are often preferred when the network elements are mobile and thus have dynamic connectivity needs, or if the network architecture is formed in an ad hoc, rather than fixed, topology. Wireless networks employ intangible physical media in an unguided propagation mode using electromagnetic waves in the radio, microwave, infra-red, optical, etc., frequency bands. Wireless networks advantageously facilitate user mobility and rapid field deployment when compared to fixed wired networks.

SUMMARY

The systems, methods, computer program products, and devices of the invention each have several aspects, no single one of which is solely responsible for the invention's desirable attributes. Without limiting the scope of this invention as expressed by the claims which follow, some features will now be discussed briefly. After considering this discussion, and particularly after reading the section entitled "Detailed Description," one will understand how the features of this invention provide advantages for devices in a wireless network.

One aspect of this disclosure provides a wireless device (e.g., an access point) for wireless communication. The wireless device is configured to allocate a plurality of resource blocks for wireless communication. The wireless device is further configured to transmit data on a first resource block of the plurality of resource blocks. The first resource block is associated with a first set of tone indices and a second set of tone indices, and the first set of tone indices is a set of nominal tone indices that is logically mapped to a second set of tone indices that is a set of physical tone indices.

In another aspect, an apparatus (e.g., an access point) for wireless communication is provided. The apparatus includes means for allocating a plurality of resource blocks for wireless communication. The apparatus includes means for transmitting data on a first resource block of the plurality of resource blocks, in which the first resource block is associated with a first set of tone indices and a second set of tone indices, and the first set of tone indices is a set of nominal tone indices that is logically mapped to a second set of tone indices that is a set of physical tone indices. In an aspect, the second set of tone indices may be based on bit reversal function of a third set of tone indices, the second set of tone indices may not include direct current tones and guard tones, and the first set of tone indices may represent a natural order of the second set of tone indices. In another aspect, the second set of tone indices may be based on an interleaver matrix function of the first set of tone indices, and an input into the interleaver matrix function may be a set of tone indices. In another aspect, each tone index in the first set of tone indices may be mapped to a corresponding tone index in the second set of tone indices based on an equation, $f(x)=i*D_m+k$, in which i is a local tone index associated with the first resource block, $D_m$ is a scaling factor, k is a resource block number associated with the first resource block, and f(x) is an index position related to the first set of tone indices. In this aspect, the corresponding tone index in the second set of tone indices may correspond to a tone index in the first set of tone indices having the index position of f(x). In another aspect, when f(x) is greater than a MaxToneIndex, in which the MaxToneIndex represents a maximum distributed tone index, f(x) is determined by a second equation, mod(f(x), MaxToneIndex), and the corresponding tone index in the second set of tone indices corresponds to a tone index in the first set of tone indices having the index position equal to mod(f(x),MaxToneIndex). In another configuration, the apparatus may include means for transmitting allocation information related to a second resource block. The second resource block may be associated with a third set of tone indices and a fourth set of tone indices, and the third set of tone indices may be a set of nominal tone indices that is logically mapped to the fourth set of tone indices that is a set of physical tone indices. In this aspect, the allocation information may include at least one of the third set of tone indices, an identifier, a resource block size, or the fourth set of tone indices. In another configuration, the apparatus may include means for receiving a plurality of data packets from a wireless device over a third set of tone indices associated with a second resource block, and each data packet of the plurality of data packets may be received over a tone index of the third set of tone indices. In this configuration, the apparatus may include means for determining a fourth set of tone indices associated with the second resource block based on the third set of tone indices, in which the third set of tone indices is a set of physical tone indices that is logically mapped to the fourth set of tone indices that is a set of nominal tone indices. In another configuration, the apparatus may include means for reordering the received plurality of data packets based on the fourth set of tone indices. In an aspect, the means for reordering may be configured to determine a tone index in the third set of tone indices on which each data packet of the plurality of data packets was received, to determine a corresponding tone index in the fourth set of tone indices for each tone index on which each data packet of the plurality of data packets was received, and to rearrange the plurality of data packets based an order of each corresponding tone index in the fourth set of tone indices. In another configuration, the means for determining the fourth set of tone indices may be configured to determine a fifth set of tone indices based on the third set of tone indices and to compare the fifth set of tone indices with a mapping table, in which the mapping table maps the fifth set of tone indices to the fourth set of tone indices. In an aspect, the fourth set of tone indices may be determined based on an interleaver matrix function and the third set of tone indices. In another configuration, the means for determining the fourth set of tone indices may be configured to, for each tone index in the third set of tone indices, determine an index position of a corresponding tone index in the fourth set of tone indices, to subtract the index position by an offset value, and to divide the difference by a scaling factor.

In another aspect, a computer-readable medium associated with an access point and storing computer executable for wireless communication. The computer-readable medium includes code for allocating a plurality of resource blocks for wireless communication. The computer-readable medium includes code for transmitting data on a first resource block of the plurality of resource blocks. The first resource block may be associated with a first set of tone indices and a second set of tone indices. The first set of tone indices may be a set of nominal tone indices that is logically mapped to a second set of tone indices that is a set of physical tone indices. In an aspect, the second set of tone indices is a based on bit reversal function of a third set of tone indices, the second set of tone indices may not include direct current tones and guard tones, and the first set of tone indices may represent a natural order of the second set of tone indices. In another aspect, the second set of tone indices may be based on an interleaver matrix function of the first set of tone indices, and an input into the interleaver matrix function may be a set of tone indices. In another aspect, each tone index in the first set of tone indices may be mapped to a corresponding tone index in the second set of tone indices based on an equation, $f(x)=i*D_m+k$, in which i is a local tone index associated with the first resource block, $D_m$ is a scaling factor, k is a resource block number associated with the first resource block, and f(x) is an index position related to the first set of tone indices. In this aspect, the corresponding tone index in the second set of tone indices may correspond to a tone index in the first set of tone indices having the index position of f(x). In another aspect, f(x) is greater than a MaxToneIndex, the MaxToneIndex represents a maximum distributed tone index, f(x) is determined by a second equation, mod(f(x),MaxToneIndex), and the corresponding tone index in the second set of tone indices corresponds to a tone index in the first set of tone indices having the index position equal to mod(f(x),MaxToneIndex). In another configuration, the computer-readable medium further includes code for transmitting allocation information related to a second resource block, in which the second resource block is associated with a third set of tone indices and a fourth set of tone indices, and the third set of tone indices is a set of nominal tone indices that is logically mapped to the fourth set of tone indices that is a set of physical tone indices. In this configuration, the allocation information may include at least one of the third set of tone indices, an identifier, a resource block size, or the fourth set of tone indices. In another configuration, the computer-readable medium may include code for receiving a plurality of data packets from a wireless device over a third set of tone indices associated with a second resource block, in which each data packet of the plurality of data packets is received over a tone index of the third set of tone indices. In this configuration, the computer-readable medium may include code for determining a fourth set of tone indices associated with the second resource block based on the third set of tone indices, in which the third set of tone indices is a set of physical tone indices that is logically mapped to the fourth set of tone indices that is a set of nominal tone indices. In another configuration, the computer-readable medium may include code for reordering the received plurality of data packets based on the fourth set of tone indices. In another configuration, the code for reordering may include code for determining a tone index in the third set of tone indices on which each data packet of the plurality of data packets was received, for determining a corresponding tone index in the fourth set of tone indices for each tone index on which each data packet of the plurality of data packets was received, and for rearranging the plurality of data packets based an order of each corresponding tone index in the fourth set of tone indices. In another configuration, the code for determining the fourth set of tone indices may include code for determining a fifth set of tone indices based on the third set of tone indices and for comparing the fifth set of tone indices with a mapping table, in which the mapping table maps the fifth set of tone indices to the fourth set of tone indices. In an aspect, the fourth set of tone indices is determined based on an interleaver matrix function and the third set of tone indices. In another configuration, the code for determining the fourth set of tone indices may include, for each tone index in the third set of tone indices, code for determining an index position of a corresponding tone index in the fourth set of tone indices, for subtracting the index position by an offset value, and for dividing the difference by a scaling factor.

Another aspect of this disclosure provides a wireless device (e.g., a station) for wireless communication. The wireless device is configured to receive allocation information related to at least one allocated resource block. The wireless device is further configured to determine a first set of tone indices associated with the at least one allocated resource block based on the received allocation information. The first set of tone indices is a function of a second set of tone indices associated with the at least one allocated resource block, and the first set of tone indices is a set of physical tone indices and the second set of tone indices is a set of nominal tone indices. The wireless device is further configured to transmit data on the determined first set of tone indices associated with the at least one allocated resource block.

In another aspect, an apparatus (e.g., a station) for wireless communication is provided. The apparatus includes means for receiving allocation information related to at least one allocated resource block. The apparatus includes means for determining a first set of tone indices associated with the at least one allocated resource block based on the received allocation information. The first set of tone indices may be a function of a second set of tone indices associated with the at least one allocated resource block, the first set of tone indices may be a set of physical tone indices, and the second set of tone indices may be a set of nominal tone indices. The apparatus includes means for transmitting data on the determined first set of tone indices associated with the at least one allocated resource block. In an aspect, the allocation information may include the second set of tone indices, and the means for determining the first set of tone indices may be configured to compare each tone index in the second set of tone indices with a mapping table, in which the mapping table indicates which tone index from the first set of tone indices corresponds to each tone index in the second set of tone indices, and to identify a tone index from the first set of tone indices that corresponds to each tone index in the second set of tone indices. In an aspect, the allocation information includes at least one identifier, the at least one identifier being associated with the at least one allocated resource block, and the determining the first set of tone indices includes determining the first set of tone indices as a function of the at least one identifier. In another configuration, the means for determining the first set of tone indices is configured to determine an interleaver matrix according to a bandwidth size and to determine the first set of tone indices based on the interleaver matrix and the at least one identifier. In another configuration, the apparatus may include means for receiving a plurality of data packets from a wireless device over a third set of tone indices associated with a second resource block, in which each data packet of the plurality of data packets is received over a tone index of the third set of tone indices, and means for determining a fourth set of tone indices associated with the second resource block based on the third set of tone indices, in which the third set of tone indices is a set of physical tone indices that is logically mapped to the fourth set of tone indices that is a set of nominal tone indices. In another configuration, the apparatus may include means for reordering the received plurality of data packets based on the fourth set of tone indices. In another configuration, the means for reordering may be configured to determine a tone index in the third set of tone indices on which each data packet of the plurality of data packets was received, to determine a corresponding tone index in the fourth set of tone indices for each tone index on which each data packet of the plurality of data packets was received, and to rearrange the plurality of data packets based an order of each corresponding tone index in the fourth set of tone indices. In another configuration, the means for determining the fourth set of tone indices may be configured to determine a fifth set of tone indices based on the third set of tone indices and to compare the fifth set of tone indices with a mapping table, in which the mapping table maps the fifth set of tone indices to the fourth set of tone indices. In an aspect, the fourth set of tone indices may be determined based on an interleaver matrix function and the third set of tone indices. In another aspect, the means for determining the fourth set of tone indices may be configured to, for each tone index in the third set of tone indices, determine an index position of a corresponding tone index in the fourth set of tone indices, subtract the index position by an offset value, and divide the difference by a scaling factor.

In another aspect, a computer-readable medium associated with a station and storing computer executable for wireless communication. The computer-readable medium includes code for receiving allocation information related to at least one allocated resource block. The computer-readable medium includes code for determining a first set of tone indices associated with the at least one allocated resource block based on the received allocation information, in which the first set of tone indices is a function of a second set of tone indices associated with the at least one allocated resource block, and the first set of tone indices is a set of physical tone indices and the second set of tone indices is a set of nominal tone indices. The computer-readable medium includes code for transmitting data on the determined first set of tone indices associated with the at least one allocated resource block. In an aspect, the allocation information includes the second set of tone indices. In this aspect, the code for determining the first set of tone indices may include code for comparing each tone index in the second set of tone indices with a mapping table, in which the mapping table indicates which tone index from the first set of tone indices corresponds to each tone index in the second set of tone indices, and for identifying a tone index from the first set of tone indices that corresponds to each tone index in the second set of tone indices. In another aspect, the allocation information includes at least one identifier, and the at least one identifier is associated with the at least one allocated resource block. In this aspect, the code for determining the first set of tone indices may include code for determining the first set of tone indices as a function of the at least one identifier. In another configuration, the code for determining the first set of tone indices further includes code for determining an interleaver matrix according to a bandwidth size and for determining the first set of tone indices based on the interleaver matrix and the at least one identifier. In another configuration, the computer-readable medium may include code for receiving a plurality of data packets from a wireless device over a third set of tone indices associated with a second resource block, in which each data packet of the plurality of data packets is received over a tone index of the third set of tone indices, and for determining a fourth set of tone indices associated with the second resource block based on the third set of tone indices, in which the third set of tone indices is a set of physical tone indices that is logically mapped to the fourth set of tone indices that is a set of nominal tone indices. In another configuration, the computer-readable medium may include code for reordering the received plurality of data packets based on the fourth set of tone indices. In another configuration, the code for reordering may include code for determining a tone index in the third set of tone indices on which each data packet of the plurality of data packets was received, for determining a corresponding tone index in the fourth set of tone indices for each tone index on which each data packet of the plurality of data packets was received, and for rearranging the plurality of data packets based an order of each corresponding tone index in the fourth set of tone indices. In another configuration, the code for determining the fourth set of tone indices may include code for determining a fifth set of tone indices based on the third set of tone indices and for comparing the fifth set of tone indices with a mapping table, in which the mapping table maps the fifth set of tone indices to the fourth set of tone indices. In another aspect, the fourth set of tone indices is determined based on an interleaver matrix function and the third set of tone indices. In another configuration, the code for determining the fourth set of tone indices may, for each tone index in the third set of tone indices, include code for determining an index position of a corresponding tone index in the fourth set of tone indices, for subtracting the index position by an offset value, and for dividing the difference by a scaling factor.

BRIEF DESCRIPTION OF THE DRAWINGS

FIG. 6 is a diagram that shows distributed tone mapping using truncated bit reversal.

FIG. 7 illustrates diagrams that show an exemplary tone index mapping for implementing distributed tone mapping using a row-column interleaver function.

FIG. 8 illustrates diagrams that show an exemplary tone index mapping using distance based logical mapping.

DETAILED DESCRIPTION

Figure 1:
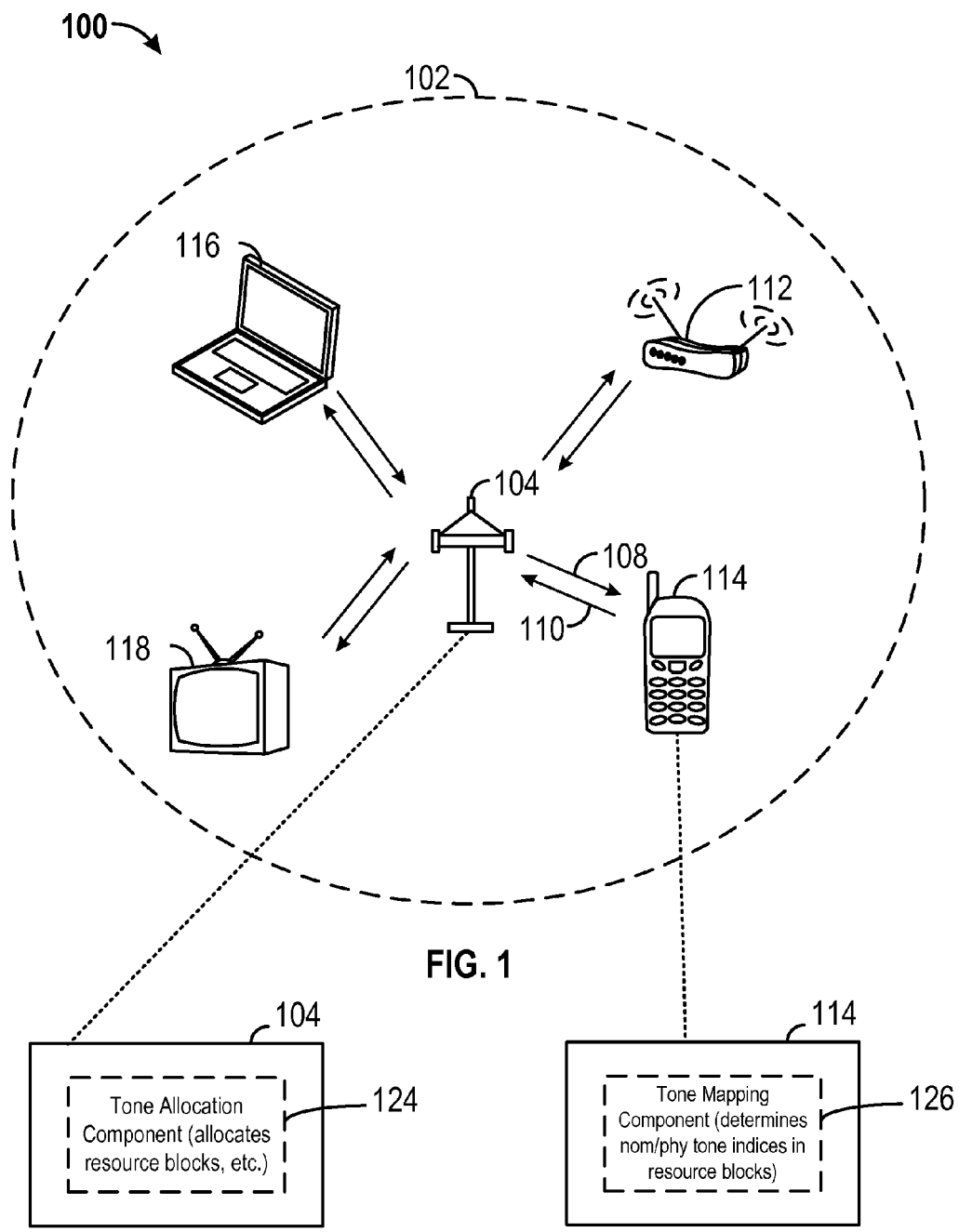
FIG. 1 shows an example wireless communication system in which aspects of the present disclosure may be employed.

Various aspects of the novel systems, apparatuses, computer program products, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, computer program products, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Popular wireless network technologies may include various types of WLANs. A WLAN may be used to interconnect nearby devices together, employing widely used networking protocols. The various aspects described herein may apply to any communication standard, such as a wireless protocol.

In some aspects, wireless signals may be transmitted according to an 802.11 protocol using orthogonal frequency-division multiplexing (OFDM), direct-sequence spread spectrum (DSSS) communications, a combination of OFDM and DSSS communications, or other schemes. Implementations of the 802.11 protocol may be used for sensors, metering, and smart grid networks. Advantageously, aspects of certain devices implementing the 802.11 protocol may consume less power than devices implementing other wireless protocols, and/or may be used to transmit wireless signals across a relatively long range, for example about one kilometer or longer.

In some implementations, a WLAN includes various devices which are the components that access the wireless network. For example, there may be two types of devices: access points (APs) and clients (also referred to as stations or "STAs"). In general, an AP may serve as a hub or base station for the WLAN and a STA serves as a user of the WLAN. For example, a STA may be a laptop computer, a personal digital assistant (PDA), a mobile phone, etc. In an example, a STA connects to an AP via a Wi-Fi (e.g., IEEE 802.11 protocol) compliant wireless link to obtain general connectivity to the Internet or to other wide area networks. In some implementations a STA may also be used as an AP.

An access point may also comprise, be implemented as, or known as a NodeB, Radio Network Controller (RNC), eNodeB, Base Station Controller (BSC), Base Transceiver Station (BTS), Base Station (BS), Transceiver Function (TF), Radio Router, Radio Transceiver, connection point, or some other terminology.

A station may also comprise, be implemented as, or known as an access terminal (AT), a subscriber station, a subscriber unit, a mobile station, a remote station, a remote terminal, a user terminal, a user agent, a user device, a user equipment, or some other terminology. In some implementations a station may comprise a cellular telephone, a cordless telephone, a Session Initiation Protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smartphone), a computer (e.g., a laptop), a portable communication device, a headset, a portable computing device (e.g., a personal data assistant), an entertainment device (e.g., a music or video device, or a satellite radio), a gaming device or system, a global positioning system device, or any other suitable device that is configured to communicate via a wireless medium.

In an aspect, MIMO schemes may be used for wide area WLAN (e.g., Wi-Fi) connectivity. MIMO exploits a radio-wave characteristic called multipath. In multipath, transmitted data may bounce off objects (e.g., walls, doors, furniture), reaching the receiving antenna multiple times through different routes and at different times. A WLAN device that employs MIMO will split a data stream into multiple parts, called spatial streams (or multi-streams), and transmit each spatial stream through separate antennas to corresponding antennas on a receiving WLAN device.

The term "associate," or "association," or any variant thereof should be given the broadest meaning possible within the context of the present disclosure. By way of example, when a first apparatus associates with a second apparatus, it should be understood that the two apparatuses may be directly associated or intermediate apparatuses may be present. For purposes of brevity, the process for establishing an association between two apparatuses will be described using a handshake protocol that requires an "association request" by one of the apparatus followed by an "association response" by the other apparatus. It will be understood by those skilled in the art that the handshake protocol may require other signaling, such as by way of example, signaling to provide authentication.

Any reference to an element herein using a designation such as "first," "second," and so forth does not generally limit the quantity or order of those elements. Rather, these designations are used herein as a convenient method of distinguishing between two or more elements or instances of an element. Thus, a reference to first and second elements does not mean that only two elements can be employed, or that the first element must precede the second element. In addition, a phrase referring to "at least one of" a list of items refers to any combination of those items, including single members. As an example, "at least one of: A, B, or C" is intended to cover: A, or B, or C, or any combination thereof (e.g., A-B, A-C, B-C, and A-B-C).

As discussed above, certain devices described herein may implement the 802.11 standard, for example. Such devices, whether used as a STA or AP or other device, may be used for smart metering or in a smart grid network. Such devices may provide sensor applications or be used in home automation. The devices may instead or in addition be used in a healthcare context, for example for personal healthcare. They may also be used for surveillance, to enable extended-range Internet connectivity (e.g. for use with hotspots), or to implement machine-to-machine communications.

FIG. 1 shows an example wireless communication system 100 in which aspects of the present disclosure may be employed. The wireless communication system 100 may operate pursuant to a wireless standard, for example the 802.11ax standard. The wireless communication system 100 may include an AP 104, which communicates with STAs (e.g., STAs 112, 114, 116, and 118).

A variety of processes and methods may be used for transmissions in the wireless communication system 100 between the AP 104 and the STAs. For example, signals may be sent and received between the AP 104 and the STAs in accordance with OFDM/Orthogonal Frequency Division Multiple Access (OFDMA) techniques. If this is the case, the wireless communication system 100 may be referred to as an OFDM/OFDMA system. Alternatively, signals may be sent and received between the AP 104 and the STAs in accordance with CDMA techniques. If this is the case, the wireless communication system 100 may be referred to as a CDMA system.

A communication link that facilitates transmission from the AP 104 to one or more of the STAs may be referred to as a downlink (DL) 108, and a communication link that facilitates transmission from one or more of the STAs to the AP 104 may be referred to as an uplink (UL) 110. Alternatively, a downlink 108 may be referred to as a forward link or a forward channel, and an uplink 110 may be referred to as a reverse link or a reverse channel. In some aspects, DL communications may include unicast or multicast traffic indications.

The AP 104 may suppress adjacent channel interference (ACI) in some aspects so that the AP 104 may receive UL communications on more than one channel simultaneously without causing significant analog-to-digital conversion (ADC) clipping noise. The AP 104 may improve suppression of ACI, for example, by having separate finite impulse response (FIR) filters for each channel or having a longer ADC backoff period with increased bit widths.

The AP 104 may act as a base station and provide wireless communication coverage in a basic service area (BSA) 102. A BSA (e.g., the BSA 102) is the coverage area of an AP (e.g., the AP 104). The AP 104 along with the STAs associated with the AP 104 and that use the AP 104 for communication may be referred to as a basic service set (BSS). It should be noted that the wireless communication system 100 may not have a central AP (e.g., AP 104), but rather may function as a peer-to-peer network between the STAs. Accordingly, the functions of the AP 104 described herein may alternatively be performed by one or more of the STAs.

The AP 104 may transmit on one or more channels (e.g., multiple narrowband channels, each channel including a frequency bandwidth) a beacon signal (or simply a "beacon"), via a communication link such as the downlink 108, to other nodes (STAs) of the wireless communication system 100, which may help the other nodes (STAs) to synchronize their timing with the AP 104, or which may provide other information or functionality. Such beacons may be transmitted periodically. In one aspect, the period between successive transmissions may be referred to as a superframe. Transmission of a beacon may be divided into a number of groups or intervals. In one aspect, the beacon may include, but is not limited to, such information as timestamp information to set a common clock, a peer-to-peer network identifier, a device identifier, capability information, a superframe duration, transmission direction information, reception direction information, a neighbor list, and/or an extended neighbor list, some of which are described in additional detail below. Thus, a beacon may include information that is both common (e.g., shared) amongst several devices and specific to a given device.

In some aspects, a STA (e.g., STA 114) may be required to associate with the AP 104 in order to send communications to and/or to receive communications from the AP 104. In one aspect, information for associating is included in a beacon broadcast by the AP 104. To receive such a beacon, the STA 114 may, for example, perform a broad coverage search over a coverage region. A search may also be performed by the STA 114 by sweeping a coverage region in a lighthouse fashion, for example. After receiving the information for associating, the STA 114 may transmit a reference signal, such as an association probe or request, to the AP 104. In some aspects, the AP 104 may use backhaul services, for example, to communicate with a larger network, such as the Internet or a public switched telephone network (PSTN).

In an aspect, the AP 104 may include one or more components for performing various functions. For example, the AP 104 may include a tone allocation component 124 configured to allocate a plurality of resource blocks for wireless communication. The tone allocation component 124 may be configured to transmit data to a STA (e.g., STA 114) on a first resource block of the plurality of resource blocks. The first resource block may be associated with a first set of tone indices and a second set of tone indices. The first set of tone indices may be a set of nominal tone indices that is logically mapped to a second set of tone indices that is a set of physical tone indices.

In another aspect, the tone allocation component 124 may be configured to receive a plurality of data packets from a second wireless device (e.g., the STA 114) over a first set of tone indices associated with a resource block. Each data packet of the plurality of data packets may be received over a tone index of the first set of tone indices. The tone allocation component 124 may be configured to determine a second set of tone indices associated with the resource block based on the first set of tone indices. In this aspect, the first set of tone indices may be a set of physical tone indices that is logically mapped to the second set of tone indices that is a set of nominal tone indices.

In another configuration, the STA 114 may include one or more components for performing various functions. For example, the STA 114 may include a tone mapping component 126 configured to receive allocation information related to at least one allocated resource block. The tone mapping component 126 may be configured to determine a first set of tones indices associated with the at least one allocated resource block based on the received allocation information. The first set of tones indices may be a function of a second set of tone indices associated with the at least one allocated resource block. The first set of tone indices may be a set of physical tone indices, and the second set of tone indices may be a set of nominal tone indices. The tone mapping component 126 may be configured to transmit data on the determined first set of tone indices associated with the at least one allocated resource block.

In another aspect, the tone mapping component 126 may be configured to receive a plurality of data packets from a second wireless device (e.g., the AP 104) over a first set of tone indices associated with a resource block. Each data packet of the plurality of data packets may be received over a tone index of the first set of tone indices. The tone mapping component 126 may be configured to determine a second set of tone indices associated with the resource block based on the first set of tone indices. The first set of tone indices may be a set of physical tone indices that is logically mapped to the second set of tone indices that is a set of nominal tone indices.

Figure 2:
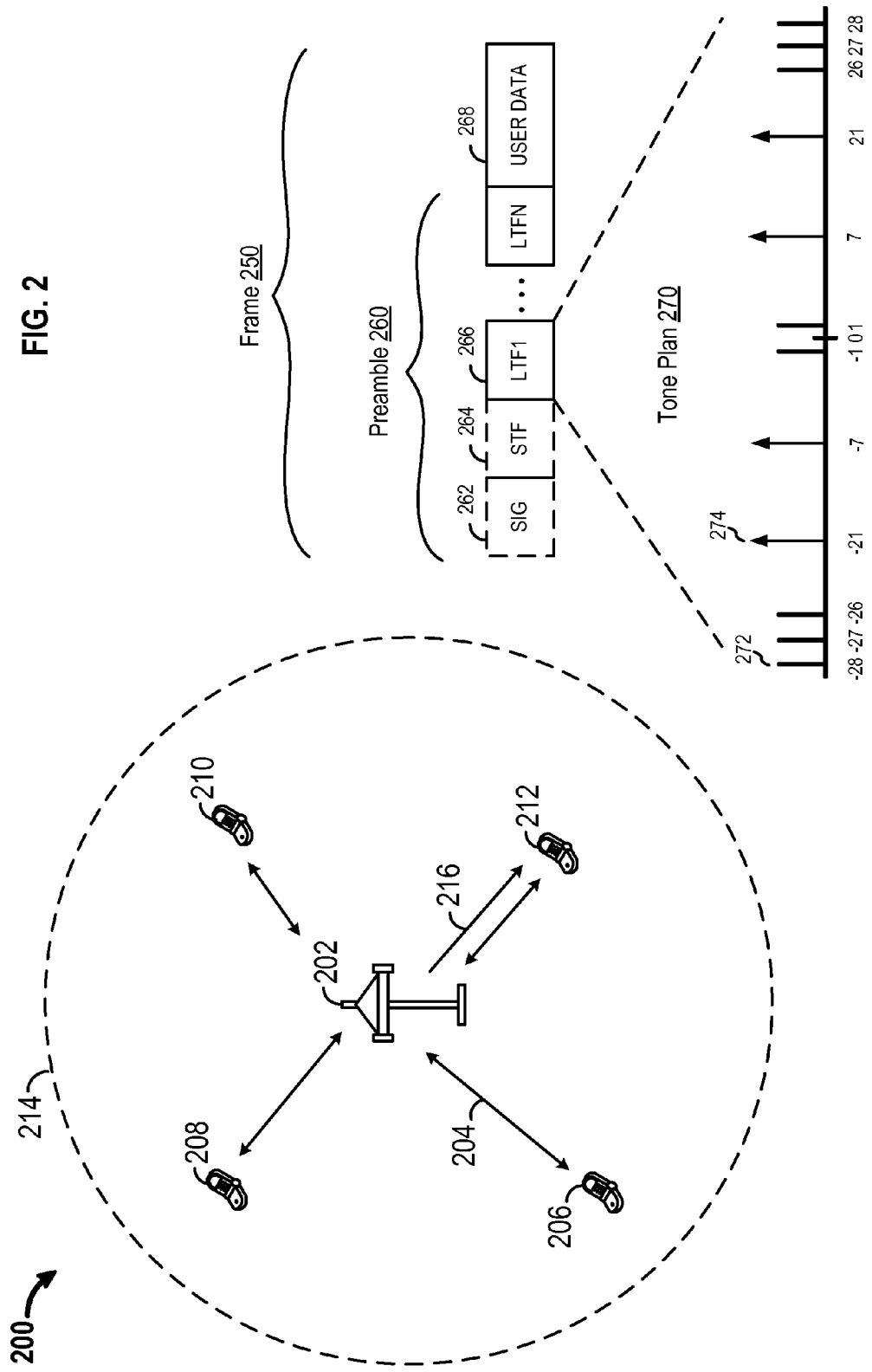
FIG. 2 is a diagram of a wireless network and a tone plan.

FIG. 2 is a diagram 200 of a wireless network (e.g., a Wi-Fi network) and a tone plan. The diagram 200 illustrates an AP 202 broadcasting/transmitting within a service area 214. STAs 206, 208, 210, 212 are within the service area 214 of the AP 202 (although only four STAs are shown in FIG. 2, more or less STAs may be within the service area 214).

The AP 202 may transmit symbols (e.g., data symbols or LTF symbols) 204 to one or more STAs (e.g., STAs 206, 208, 210, 212) in one or more frames, and vice versa. A frame 250 may include a preamble 260 and data symbols 268. The preamble 260 may be considered a header of the frame 250 with information identifying a modulation scheme, a transmission rate, and a length of time to transmit the frame 250. The preamble 260 may include a signal (SIG) field 262, a short training field (STF) 264, and one or more long training field (LTF) symbols 266 (e.g., LTF1, LTF2, . . . , LTFN). The SIG field 262 may be used to transfer rate and length information. The SIG field 262 may also be used to indicate a set of tone indices (e.g., nominal tone indices) that has been allocated to a wireless device (e.g., the AP 202 or the STA 206). The STF 264 may be used to improve automatic gain control (AGC) in a multi-transmit and multi-receive system. The LTF symbols 266 may be used to provide the information needed for a receiver (e.g., the STA 206) to perform channel estimation. The number of LTF symbols may be equal to or greater than the number of space-time streams from different STAs. For example, if there are 4 STAs, there may be 4 LTF symbols (i.e., LTF1, LTF2, LTF3, LTF4). The data symbols 268 contain the user data to be communicated between the STA 206, for example, and the AP 202.

In one configuration, the AP 202 may transmit a trigger message 216 to one or more STAs (e.g., the STA 212). In one aspect, the trigger message 216 may indicate a set of tone indices (e.g., nominal tone indices) that has been allocated to the STA. In another aspect, the trigger message 216 may include other allocation information that may be used by the STA to determine the set of tone indices that has been allocated to the STA.

In one aspect, the LTF symbols 266 (and data symbols 268) may have a tone plan that indicates which tones are guard tones, data tones, pilot tones, and direct current (DC) tones. For example, tone plan 270 is an example of a tone plan for a 20 megahertz (MHz) symbol with 1× symbol duration. The tone plan 270 has 64 tones located within a tone indices range of −32 to 31 or [−32:31]. As shown in FIG. 2, however, not all tone indices are pictured. The tone indices not pictured [−32:−29] and [29:31] are guard tones, which are tones that may have zero amplitude and are used to provide isolation or system separation from neighboring transmissions/symbols in order to reduce the likelihood of tones from different symbols bleeding together. A DC tone, located at tone index 0 in this example, has no power and may be used for AGC setup. Although this example illustrates one DC tone at tone index 0, additional DC tones may be used (e.g., 3 DC tones may be located at tone indices −1, 0, and 1). In this example, the remaining tone indices [−28:−1] and [1:28] contain usable tones that may used to transmit data (e.g., for channel estimation) and pilot signals (e.g., for phase drift correction). In the tone plan 270, data 272 may be transmitted on tone indices −28, −27, −26, −10, −5, 5, 10, 26, 27, and 28, for example. A pilot signal 274 for phase drift correction, for example, may be transmitted on tone index −21. Additional pilot signals (as indicted by vertical arrows in FIG. 2) may be transmitted on tone indices −7, 7, and 21. Because the first valid tone, after the guard tones on which data or pilot signals may be transmitted, is located on tone index −28, this tone index may be known as a valid start tone index. Similarly, tone index 28 may be known as a valid end tone index because tone index 28 is the last valid tone on which data or pilot signals may be transmitted before reaching tone indices [29:31], which are reserved for guard tones. In sum, the tone plan 270 has usable tones within a tone indices range of [−28:−1] and [1:28].

Referring again to FIG. 2, although the LTF symbol 266 (e.g., LTF1) has a 1× symbol duration as evidenced by the tone plan 270, some wireless networks may use symbols with a 4× symbol duration. Symbols with a 4× symbol duration may have a total of 256 tones of which 242 tones are usable tones (excluding guard tones and DC tones). For example, a symbol with a 4× symbol duration may have usable tones within a tone indices range of [−122:−2] and [2:122]. In one configuration, three DC tones may be located on tone indices [−1:1], and guard tones may be located on tone indices [−128:−123] and [123:127]. The tone indices for a symbol with a 4× symbol duration may also be represented by the range [0:255] instead of [−128:127]. Like the range [−128:127], the range [0:255] contains 256 tones but represents each tone index using a positive integer.

In an aspect, certain tones may be designated as common pilot tones. These tones may be used as pilot tones for all the users of the OFDMA transmission. For example, in a DL OFDMA transmission, the transmitting device may use these tones as pilot tones, and each receiving device may receive the common pilot tones, and use those tones for channel estimation and other purposes. Accordingly, the tones which may be used as common pilot tones may not be assigned to any user. In certain transmissions, there may also be certain unused or unoccupied tones. For example, these tones may be unused due to a lack of queued data that needs to be transmitted on those tones, or due to the use of a tone plan which does not require that all of the available tones be used.

Generally, a Wi-Fi network may have a specified bandwidth that includes a certain number of tones. A set of tones within the bandwidth may be grouped into a resource block. In OFDMA, for example, the resource blocks or tones may be allocated among multiple wireless devices within the Wi-Fi network to enable different STAs to transmit in the uplink or receive in the downlink simultaneously. Each resource block may represent a subband. When users transmit on the allocated resource blocks, however, the users need not transmit on the same allocated tone indices that correspond to the resource block. In some instances, the allocated tone indices may be logically mapped to a different set of physical tone indices for transmission.

Figure 3:
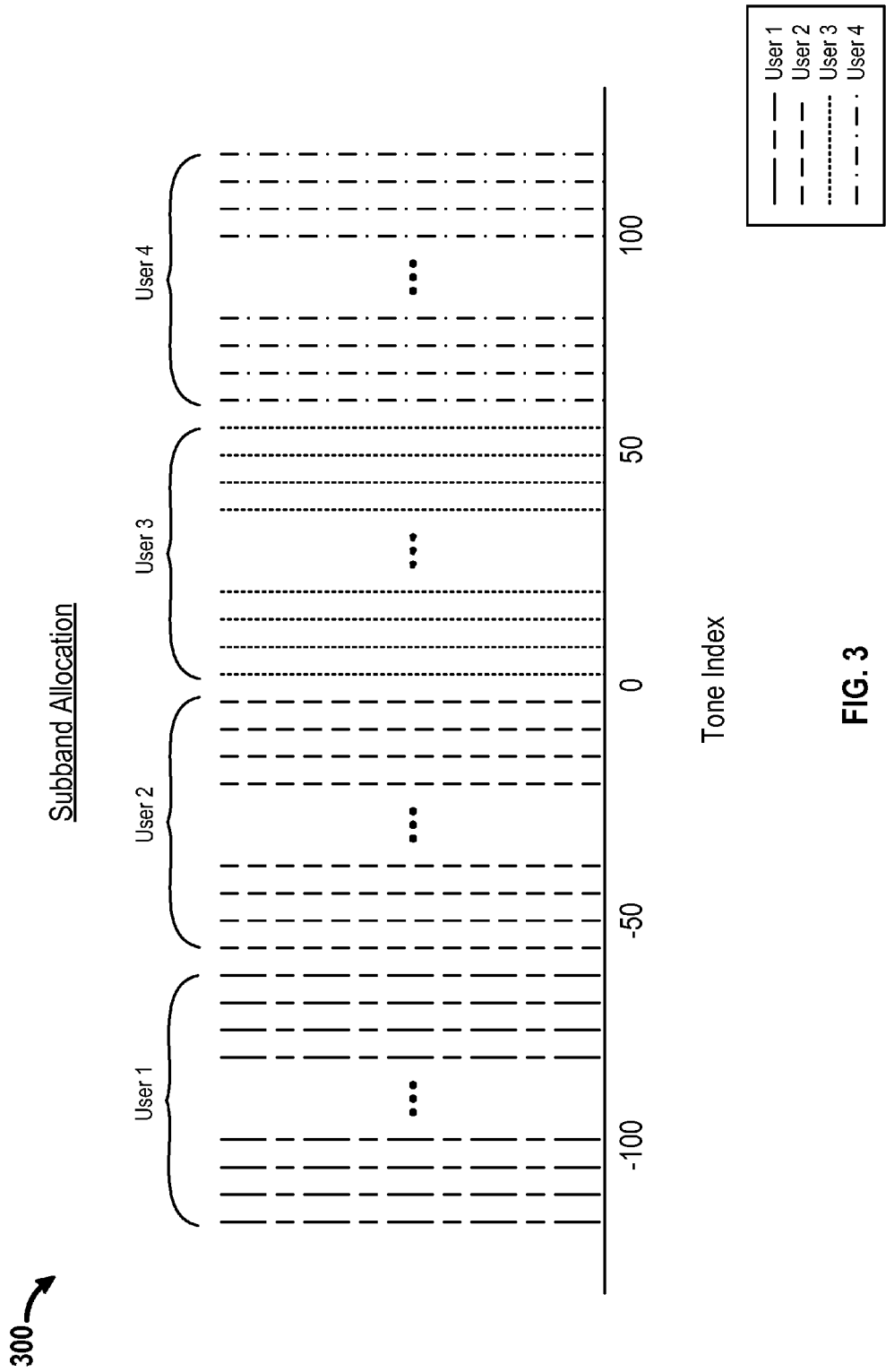
FIG. 3 illustrates an exemplary subband allocation for a 20 MHz 4× symbol.

In one configuration, the allocated tones indices within a resource block and the actual physical tone indices used for transmission by the resource block may be the same as shown in FIG. 3. FIG. 3 illustrates an exemplary subband allocation 300 for a 20 MHz 4× symbol. In a subband allocation, the total bandwidth may be divided into a number of subbands. For example, in FIG. 3, the total bandwidth has been divided into four subbands. Each of those subbands is then assigned to a single user, and that user transmits (or receives) on each tone of that subband. Subband allocation may enable more efficient use of a set of available tones.

For example, in a 20 MHz transmission with a 4× symbol duration, there may be 11 guard tones and 5 DC tones. This may leave 240 tones for the various users to use, which may be used as pilot tones, data tones, or other tones (such as additional guard or DC tones). Accordingly, when these tones are divided between four users, as illustrated, each user may be assigned 60 tones. The tones indices of a transmission may be numbered from −128 to 127 (or [0:255]), with the usable tones indices being those numbered from −122 to −3, and from 3 to 122. As shown in FIG. 3, there are 4 subbands—[−122:−63], [−62:−3], [3:62], and [63:122]. Users 1-4 may be assigned to each subband, respectively. For example, when assigning tones using a subband allocation, User 1 may be assigned each tone from −122 to −63, User 2 may be assigned each tone from −62 to −3, User 3 may be assigned each tone from 3 to 62, and User 4 may be assigned each tone from 63 to 122. If the allocated tone indices and the corresponding physical tone indices are the same, then User 1 may be allocated tone indices −122 to −63 and also transmit on tone indices −122 to −63, for example.

Accordingly, in a subband allocation, each user occupies a chunk of tones that form a contiguous frequency band. No other users' tones are located within that frequency band. However, unoccupied tones, such as DC tones or tones that carry common information (pilot tones, tones for control information), may be located within a user's tone allocation.

Figure 4:
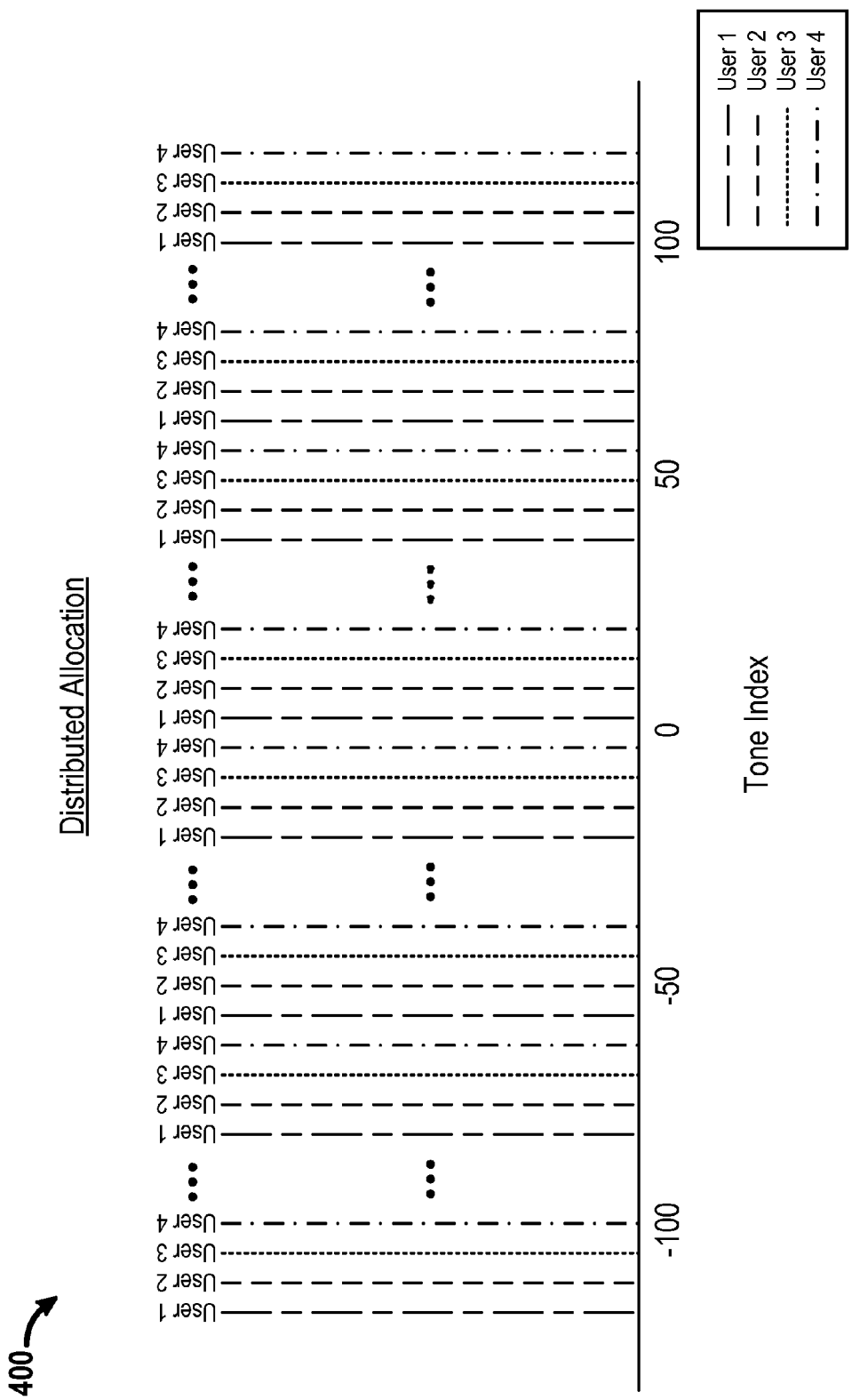
FIG. 4 is an exemplary illustration of a distributed allocation in which tones for a 20 MHz, 4× symbol duration transmission are allocated evenly between four users.

In another configuration, the allocated tones indices associated with an allocated resource block are logically mapped to a different set of physical tone indices. FIG. 4 is an exemplary illustration of a distributed allocation 400 in which tones for a 20 MHz, 4× symbol duration transmission are allocated evenly between four users. Generally, in a distributed tone mapping, a user is allocated a set of tone indices within a resource block. When the user transmits on the allocated set of tones, however, the data may be transmitted on every nth tone of all the usable tones, where n may be the number of users in the allocation. Generally, the usable tones may be the tones which are not being used as guard tones and DC tones. Note that, generally, each tone discussed herein is a "usable" tone, rather than a guard tone and DC tone. Accordingly, in distributed tone mapping, a device may be allocated a subband of tone indices, but a device may transmit on every nth usable tone, which does not include those other tones. For example, as illustrated in FIG. 4, when there are four users in a distributed tone mapping, each user may transmit on every 4th tone. Users 1-4 are denoted by different line types. As shown in FIG. 4, User 1 transmits on the left most tone index, corresponding to tone index −122. User 2 transmits on the second left most tone index, corresponding to tone index −121. User 3 transmits on the third left most tone index, corresponding to tone index −120. User 4 transmits on the fourth left most tone index, corresponding to tone index −199. From then on, every user transmits on every 4th tone index.

Compared to subband-based OFDMA transmission, distributed OFDMA tone mapping may enable greater frequency diversity gain and transmission power advantage. This may be especially true for uplink transmission. Logical mapping may be used to connect resource tone allocation with actual physical tones for transmission. Logical mapping methods may be transparent to the uplink and downlink and independent of the number of users. Logical mapping methods may be simple and systematic for all bandwidths so as not to introduce significant delay in processing. As such, de-mapping may be simple and may not create a bottleneck in receiver processing delay. In logical mapping, the mapped, distributed set of physical tone indices may be spread over at least some minimum bandwidth for purposes of having a power advantage. The minimum bandwidth may be determined by peak power divided by the power spectrum density (PSD) limit. Assuming total power limit of 24 dBm and a PSD limit of 11 dBm/MHz, the minimum bandwidth may be determined to be 20 MHz. For OFDMA bandwidths greater than 20 MHz, logical mapping can be performed per 20 MHz logical tone mapping for the user assigned to a certain 20 MHz resource block (hybrid distributed OFDMA), or logical mapping can be performed on the entire bandwidth (regular distributed OFDMA). For downlink or single users, pilot tones from different resource blocks may be spread out so that common pilots can provide more diversity compared to having dedicated pilots in each resource block. For uplink, pilots may evenly spread over the bandwidth such that all user pilots may cluster together.

Furthermore, in logical tone mapping, the usable tone indices may be mapped and the unusable tone indices may not be mapped (neither from nor to) to keep the location known to any receiver. In one embodiment, unusable tone indices/locations may include DC tones, guard tones, and special center blocks, edge blocks, and left and right center blocks. Usable tones (e.g., data tones and pilot tones) may be the remaining tones within the tone plan.

Figure 5:
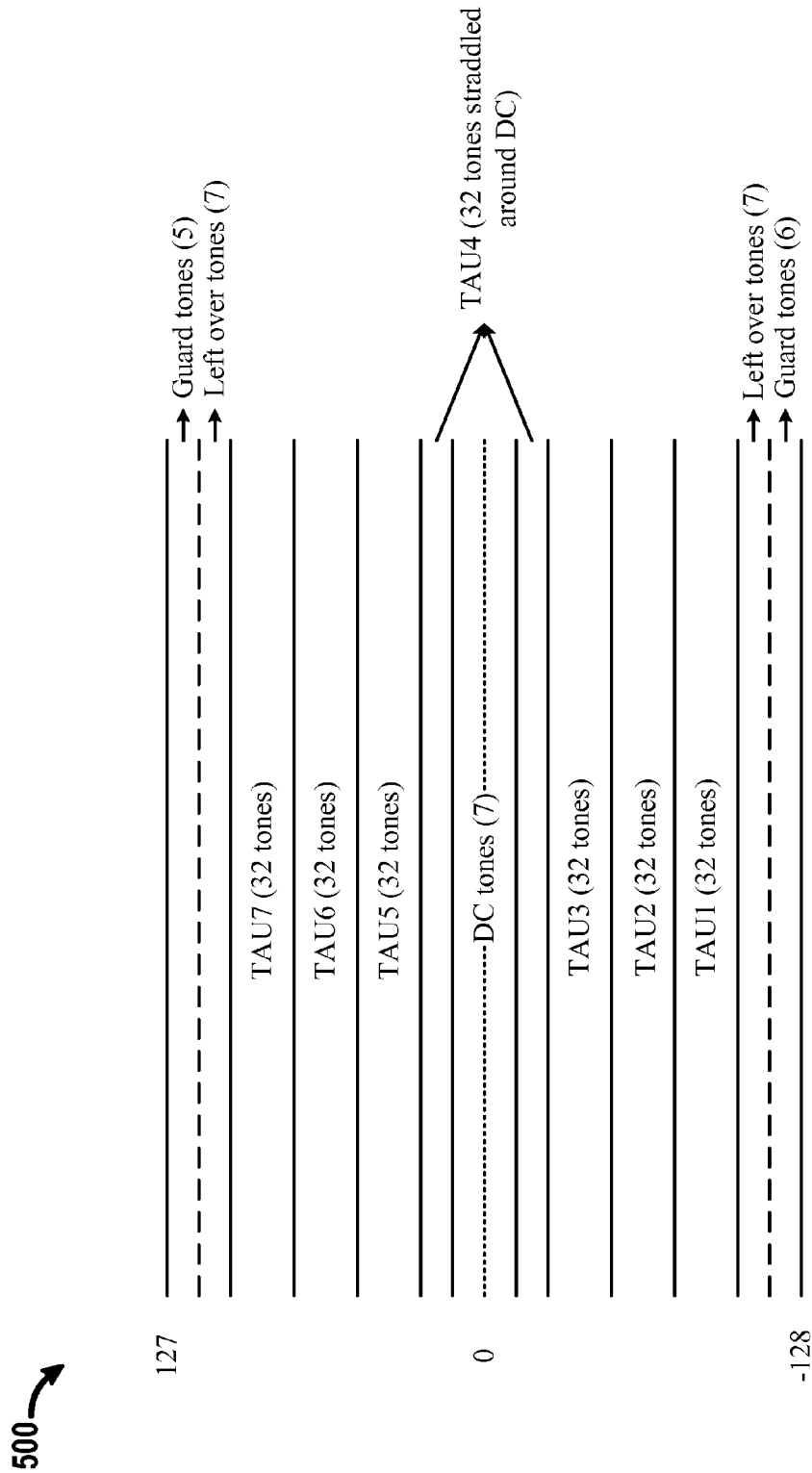
FIG. 5 illustrates a 20 MHz tone plan for a symbol with a 4× symbol duration.

FIG. 5 illustrates a 20 MHz tone plan 500 for a symbol with a 4× symbol duration. As shown in FIG. 5, there are 256 tones spread over a tone indices range of −128 to 127. This range of tone indices may alternatively be referred to as 0 to 255 or [0:255]. In a wireless network, each wireless device (e.g., the AP 202 or the STA 206) may be allocated one or more tone allocation units (TAUs) or resource blocks for data transmission. Each TAU may have 32 tones and the tones may be contiguous. Assuming 7 DC tones and 11 guard tones, a 20 MHz symbol with a 4× symbol duration may have 7 TAUs with 14 tones remaining or left over. The remaining 14 tones may be split into 2 segments of 7 tones each, and each 7-tone segment may be located next to the guard tones as shown in FIG. 5. In another aspect, the DC tones may be straddled by the 7-tone segments. The TAU4 may straddle the 32 tones around DC. In one aspect, the remaining 14 tones may be used for common control (e.g., signaling, scheduling, power control, etc.). In another aspect, the remaining 14 tones may be used to create a small TAU with 14 tones. In this aspect, there would be a total of 7 32-tone TAUs and 1 14-tone TAU, for a total of 8 TAUs, which may be divisible among 4 or 8 users.

FIG. 5 is similar to FIG. 3 in that, instead of 4 subbands, there are 7 subbands. And each wireless device may be allocated one or more TAUs. As currently depicted, however, when a wireless device is allocated TAU1, for example, and the wireless device transmits data using the allocated TAU1, the transmitted data may be on adjacent and contiguous tones. To perform distributed tone mapping in OFDMA, one may map the allocated tones indices in TAU1, for example, to different set of physical tones indices that are distributed over and span the bandwidth (or range of tone indices [−128:127] or [0:255]. In order words, TAU1 may be associated with a nominal set of tone indices (e.g., the allocated tone indices) that may be logically mapped to a different physical set of tone indices.

FIG. 6 is a diagram 600 that shows distributed tone mapping using truncated bit reversal. In this case, assume that a resource block (e.g., TAU1) is associated with the tone indices depicted in column 2. Additional tone indices associated with the resource block are not depicted to simplify the explanation of the method. Based on the tone indices in column 2, a binary representation of those tone indices is determined in column 3. In column 4, the bit order of column 3 is reversed. For example, "001" in column 3 is now "100" in column 4. Similarly, "011" in column 3 is "110" in column 4. Having reversed the bits, the distributed tone index in column 5 may be determined by converting the binary bits in column 4 to decimal numbers in column 5. In truncated bit reversal, however, only usable tones are mapped. DC tones and guard tones are precluded from mapping. Assuming the distributed tone index 0 is a DC tone, and the distributed tone indices 3 and 4 are guard tones, these tones are deleted (shown as crossed out) from the mapping. The deleted tone indices are denoted by strikethroughs in FIG. 6. Having deleted the tones precluded from mapping, usable tones indices 2, 6, 1, 5, 7 remain in column 5. Tone indices 2, 6, 1, 5, 7 may be referred to as a set of physical tones associated with the resource block (e.g., TAU1). The tone indices 2, 6, 1, 5, 7 may be placed into their natural order in column 1. Column 1 represents a set of nominal tone indices that logically maps to a set of physical tone indices in column 5. For example, nominal tone index 1 maps to physical tone index 2. Nominal tone index 2 maps to physical tone index 6. Nominal tone index 5 maps to physical tone index 1. Nominal tone index 6 maps to physical tone index 5. And nominal tone index 7 maps to physical tone index 7. As such, the resource block (e.g., TAU1) will now be associated with a set of nominal tone indices 1, 2, 5, 6, 7 and set of physical tone indices 2, 6, 1 5, 7. When a wireless device (e.g., the AP 202 or the STA 212) is allocated resource block TAU1, for example, the wireless device may be allocated the set of nominal tones indices 1, 2, 5, 6, 7 that may be mapped to a different set of physical tone indices 2, 6, 1, 5, 7.

In one example, the AP 202 may allocate a number of resource blocks (e.g., TAU1-7 in FIG. 5) for wireless communication. The AP 202 may be allocated TAU1 and may transmit data packets to the STA 212 using TAU1. TAU1 may be associated with the set of nominal tone indices 1, 2, 5, 6, 7, which is logically mapped to the set of physical tone indices 2, 6, 1, 5, 7, respectively. Both sets of tone indices may be associated with TAU1. When the AP 202 transmits data packets on TAU1, the data packets will actually be transmitted on the mapped set of physical indices 2, 6, 1, 5, 7. In one aspect, the AP 202 may have a mapping table that logically maps the set of nominal indices (column 1) to the set of physical indices (column 5). In the truncated bit reversal tone mapping method, the set of physical tones is based on a bit reversal function of the set of tone indices in column 3, and the set of physical tones (column 5) does not include DC tones and guard tones. The set of nominal tone indices 1, 2, 5, 6, 7 represents a natural order of the set of physical tone indices 2, 6, 1, 5, 7.

Continuing with the example, the STA 212 may receive the data packets from the AP 202 over the distributed set of physical tone indices 2, 6, 1, 5, 7 (column 5). Because the data packets may be out of order as a result of the logical tone mapping, the STA 212 may perform de-mapping to place the data packets in the proper order. In one configuration, the STA 212 may use Fast Fourier Transform (FFT) processing one the set of physical tone indices 2, 6, 1, 5, 7 to obtain the set of indices from column 2. In FFT processing, using radix-2 decimation in time, an input of the tone indices in column 5 would output the tone indices in column 2. After mapping the set of physical tone indices back to column 2, the STA 212 may compare the column 2 tone indices with a mapping or look-up table to determine the corresponding set of nominal tone indices on column 1. In another configuration, the STA 212 may have a mapping table that directly maps column 5 to column 1. In this configuration, upon receiving the data packets on the set of physical tone indices 2, 6, 1, 5, 7 (column 5), the STA 212 may map the set of physical tone indices (column 5) to the set of nominal tone indices (column 1). Based on the set of nominal tone indices, the STA 212 may reorder the data packets for decoding.

Although this example is discussed with respect to downlink, the same procedure/method may be used for uplink. That is, the AP 202 may allocate TAU1 to the STA 212 by transmitting a trigger message 216 to the STA 212. The trigger message 216 may include the set of nominal tone indices associated with TAU1, and the set of nominal tone indices may be logically mapped to a set of physical tone indices 2, 6, 1, 5, 7. The STA 212 may receive the trigger message 216 containing the set of nominal tone indices 1, 2, 5, 6, 7. The STA 212 may compare each tone index in the set of nominal tone indices with a mapping table. The mapping table may indicate a tone index in the set of physical tone indices that corresponds to each tone index in the set of nominal tone indices. Based on this comparison with the mapping table, the STA 212 may identify a set of physical tone indices that corresponds to the received set of nominal tone indices. The STA 212 may transmit data packets over the set of nominal indices 1, 2, 5, 6, 7, and as a result of the mapping, the data packets will actually be transmitted over the set of physical indices 2, 6, 1, 5, 7. The AP 202 may receive the data packets over the set of physical indices and perform the de-mapping mentioned above to reorder the data packets for decoding.

Truncated bit reversal logical mapping may only be applicable to usable tones, as mentioned above. The number of usable tones is less than an FFT size for each corresponding bandwidth (e.g., 20 MHz, 40 MHz, 80 MHz) and may not be a power of 2. Also, depending on the different bandwidths, the mapping tables would change. Truncated bit reversal mapping also excludes DC and guard tones from mapping. Other tone locations, such as center block and left and right center blocks may be excluded as well. In truncated bit reversal logical mapping, de-mapping may not impose significant delay in receiver processing if the aforementioned FFT processing or mapping table is used. Additionally, pilot tones from different resource blocks may be more spread out due to the bit reversal property. This could bring some processing gain when using downlink common pilots. Truncated bit reversal mapping is not dependent on the number of users.

TABLE 1

Example Logical Mapping for 20 MHz Symbol

| Nominal Tone Index | Index | Bit | Reverse | Distributed Tone Index |
|---|---|---|---|---|
| | ~~0~~ | ~~00000000~~ | ~~00000000~~ | ~~0~~ |
| | ~~1~~ | ~~00000001~~ | ~~10000000~~ | ~~128~~ |
| 11 | 2 | 00000010 | 01000000 | 64 |
| 12 | 3 | 00000011 | 11000000 | 192 |
| 13 | 4 | 00000100 | 00100000 | 32 |
| 14 | 5 | 00000101 | 10100000 | 160 |
| 15 | 6 | 00000110 | 01100000 | 96 |
| 16 | 7 | 00000111 | 11100000 | 224 |
| 17 | 8 | 00001000 | 00010000 | 16 |
| 18 | 9 | 00001001 | 10010000 | 144 |
| 19 | 10 | 00001010 | 01010000 | 80 |
| 20 | 11 | 00001011 | 11010000 | 208 |
| 21 | 12 | 00001100 | 00110000 | 48 |
| 22 | 13 | 00001101 | 10110000 | 176 |
| 23 | 14 | 00001110 | 01110000 | 112 |
| 24 | 15 | 00001111 | 11110000 | 240 |
| | ~~16~~ | ~~00010000~~ | ~~00001000~~ | ~~8~~ |
| 25 | 17 | 00010001 | 10001000 | 136 |
| 26 | 18 | 00010010 | 01001000 | 72 |
| 27 | 19 | 00010011 | 11001000 | 200 |
| 28 | 20 | 00010100 | 00101000 | 40 |
| 29 | 21 | 00010101 | 10101000 | 168 |
| 30 | 22 | 00010110 | 01101000 | 104 |
| 31 | 23 | 00010111 | 11101000 | 232 |
| 32 | 24 | 00011000 | 00011000 | 24 |
| 33 | 25 | 00011001 | 10011000 | 152 |
| 34 | 26 | 00011010 | 01011000 | 88 |
| 35 | 27 | 00011011 | 11011000 | 216 |
| 36 | 28 | 00011100 | 00111000 | 56 |
| 37 | 29 | 00011101 | 10111000 | 184 |
| 38 | 30 | 00011110 | 01111000 | 120 |
| | ~~31~~ | ~~00011111~~ | ~~11111000~~ | ~~248~~ |
| | ~~32~~ | ~~00100000~~ | ~~00000100~~ | ~~4~~ |
| | ~~33~~ | ~~00100001~~ | ~~10000100~~ | ~~132~~ |
| 39 | 34 | 00100010 | 01000100 | 68 |
| 40 | 35 | 00100011 | 11000100 | 196 |
| 41 | 36 | 00100100 | 00100100 | 36 |
| 42 | 37 | 00100101 | 10100100 | 164 |
| 43 | 38 | 00100110 | 01100100 | 100 |
| 44 | 39 | 00100111 | 11100100 | 228 |
| 45 | 40 | 00101000 | 00010100 | 20 |
| 46 | 41 | 00101001 | 10010100 | 148 |
| 47 | 42 | 00101010 | 01010100 | 84 |
| 48 | 43 | 00101011 | 11010100 | 212 |
| 49 | 44 | 00101100 | 00110100 | 52 |
| 50 | 45 | 00101101 | 10110100 | 180 |
| 51 | 46 | 00101110 | 01110100 | 116 |
| 52 | 47 | 00101111 | 11110100 | 244 |
| 53 | 48 | 00110000 | 00001100 | 12 |
| 54 | 49 | 00110001 | 10001100 | 140 |
| 55 | 50 | 00110010 | 01001100 | 76 |
| 56 | 51 | 00110011 | 11001100 | 204 |
| 57 | 52 | 00110100 | 00101100 | 44 |
| 58 | 53 | 00110101 | 10101100 | 172 |
| 59 | 54 | 00110110 | 01101100 | 108 |

TABLE 1-continued

Example Logical Mapping for 20 MHz Symbol

| Nominal Tone Index | Index | Bit | Reverse | Distributed Tone Index |
|---|---|---|---|---|
| 60 | 55 | 00110111 | 11101100 | 236 |
| 61 | 56 | 00111000 | 00011100 | 28 |
| 62 | 57 | 00111001 | 10011100 | 156 |
| 63 | 58 | 00111010 | 01011100 | 92 |
| 64 | 59 | 00111011 | 11011100 | 220 |
| 65 | 60 | 00111100 | 00111100 | 60 |
| 66 | 61 | 00111101 | 10111100 | 188 |
| | ~~62~~ | ~~00111110~~ | ~~01111100~~ | ~~124~~ |
| | ~~63~~ | ~~00111111~~ | ~~11111100~~ | ~~252~~ |
| | ~~64~~ | ~~01000000~~ | ~~00000010~~ | ~~2~~ |
| | ~~65~~ | ~~01000001~~ | ~~10000010~~ | ~~130~~ |
| 67 | 66 | 01000010 | 01000010 | 66 |
| 68 | 67 | 01000011 | 11000010 | 194 |
| 69 | 68 | 01000100 | 00100010 | 34 |
| 70 | 69 | 01000101 | 10100010 | 162 |
| 71 | 70 | 01000110 | 01100010 | 98 |
| 72 | 71 | 01000111 | 11100010 | 226 |
| 73 | 72 | 01001000 | 00010010 | 18 |
| 74 | 73 | 01001001 | 10010010 | 146 |
| 75 | 74 | 01001010 | 01010010 | 82 |
| 76 | 75 | 01001011 | 11010010 | 210 |
| 77 | 76 | 01001100 | 00110010 | 50 |
| 78 | 77 | 01001101 | 10110010 | 178 |
| 79 | 78 | 01001110 | 01110010 | 114 |
| 80 | 79 | 01001111 | 11110010 | 242 |
| | ~~80~~ | ~~01010000~~ | ~~00001010~~ | ~~10~~ |
| 81 | 81 | 01010001 | 10001010 | 138 |
| 82 | 82 | 01010010 | 01001010 | 74 |
| 83 | 83 | 01010011 | 11001010 | 202 |
| 84 | 84 | 01010100 | 00101010 | 42 |
| 85 | 85 | 01010101 | 10101010 | 170 |
| 86 | 86 | 01010110 | 01101010 | 106 |
| 87 | 87 | 01010111 | 11101010 | 234 |
| 88 | 88 | 01011000 | 00011010 | 26 |
| 89 | 89 | 01011001 | 10011010 | 154 |
| 90 | 90 | 01011010 | 01011010 | 90 |
| 91 | 91 | 01011011 | 11011010 | 218 |
| 92 | 92 | 01011100 | 00111010 | 58 |
| 93 | 93 | 01011101 | 10111010 | 186 |
| 94 | 94 | 01011110 | 01111010 | 122 |
| | ~~95~~ | ~~01011111~~ | ~~11111010~~ | ~~250~~ |
| | ~~96~~ | ~~01100000~~ | ~~00000110~~ | ~~6~~ |
| 95 | 97 | 01100001 | 10000110 | 134 |
| 96 | 98 | 01100010 | 01000110 | 70 |
| 97 | 99 | 01100011 | 11000110 | 198 |
| 98 | 100 | 01100100 | 00100110 | 38 |
| 99 | 101 | 01100101 | 10100110 | 166 |
| 100 | 102 | 01100110 | 01100110 | 102 |
| 101 | 103 | 01100111 | 11100110 | 230 |
| 102 | 104 | 01101000 | 00010110 | 22 |
| 103 | 105 | 01101001 | 10010110 | 150 |
| 104 | 106 | 01101010 | 01010110 | 86 |
| 105 | 107 | 01101011 | 11010110 | 214 |
| 106 | 108 | 01101100 | 00110110 | 54 |
| 107 | 109 | 01101101 | 10110110 | 182 |
| 108 | 110 | 01101110 | 01110110 | 118 |
| | ~~111~~ | ~~01101111~~ | ~~11110110~~ | ~~246~~ |
| 109 | 112 | 01110000 | 00001110 | 14 |
| 110 | 113 | 01110001 | 10001110 | 142 |
| 111 | 114 | 01110010 | 01001110 | 78 |
| 112 | 115 | 01110011 | 11001110 | 206 |
| 113 | 116 | 01110100 | 00101110 | 46 |
| 114 | 117 | 01110101 | 10101110 | 174 |
| 115 | 118 | 01110110 | 01101110 | 110 |
| 116 | 119 | 01110111 | 11101110 | 238 |
| 117 | 120 | 01111000 | 00011110 | 30 |
| 118 | 121 | 01111001 | 10011110 | 158 |
| 119 | 122 | 01111010 | 01011110 | 94 |
| 120 | 123 | 01111011 | 11011110 | 222 |
| 121 | 124 | 01111100 | 00111110 | 62 |
| 122 | 125 | 01111101 | 10111110 | 190 |
| | ~~126~~ | ~~01111110~~ | ~~01111110~~ | ~~126~~ |
| | ~~127~~ | ~~01111111~~ | ~~11111110~~ | ~~254~~ |
| | ~~128~~ | ~~10000000~~ | ~~00000001~~ | ~~1~~ |
| | ~~129~~ | ~~10000001~~ | ~~10000001~~ | ~~129~~ |

TABLE 1-continued

Example Logical Mapping for 20 MHz Symbol

| Nominal Tone Index | Index | Bit | Reverse | Distributed Tone Index |
|---|---|---|---|---|
| 134 | 130 | 10000010 | 01000001 | 65 |
| 135 | 131 | 10000011 | 11000001 | 193 |
| 136 | 132 | 10000100 | 00100001 | 33 |
| 137 | 133 | 10000101 | 10100001 | 161 |
| 138 | 134 | 10000110 | 01100001 | 97 |
| 139 | 135 | 10000111 | 11100001 | 225 |
| 140 | 136 | 10001000 | 00010001 | 17 |
| 141 | 137 | 10001001 | 10010001 | 145 |
| 142 | 138 | 10001010 | 01010001 | 81 |
| 143 | 139 | 10001011 | 11010001 | 209 |
| 144 | 140 | 10001100 | 00110001 | 49 |
| 145 | 141 | 10001101 | 10110001 | 177 |
| 146 | 142 | 10001110 | 01110001 | 113 |
| 147 | 143 | 10001111 | 11110001 | 241 |
| ~~144~~ | ~~144~~ | ~~10010000~~ | ~~00001001~~ | ~~9~~ |
| 148 | 145 | 10010001 | 10001001 | 137 |
| 149 | 146 | 10010010 | 01001001 | 73 |
| 150 | 147 | 10010011 | 11001001 | 201 |
| 151 | 148 | 10010100 | 00101001 | 41 |
| 152 | 149 | 10010101 | 10101001 | 169 |
| 153 | 150 | 10010110 | 01101001 | 105 |
| 154 | 151 | 10010111 | 11101001 | 233 |
| 155 | 152 | 10011000 | 00011001 | 25 |
| 156 | 153 | 10011001 | 10011001 | 153 |
| 157 | 154 | 10011010 | 01011001 | 89 |
| 158 | 155 | 10011011 | 11011001 | 217 |
| 159 | 156 | 10011100 | 00111001 | 57 |
| 160 | 157 | 10011101 | 10111001 | 185 |
| 161 | 158 | 10011110 | 01111001 | 121 |
| | ~~159~~ | ~~10011111~~ | ~~11111001~~ | ~~249~~ |
| | ~~160~~ | ~~10100000~~ | ~~00000101~~ | ~~5~~ |
| | ~~161~~ | ~~10100001~~ | ~~10000101~~ | ~~133~~ |
| 162 | 162 | 10100010 | 01000101 | 69 |
| 163 | 163 | 10100011 | 11000101 | 197 |
| 164 | 164 | 10100100 | 00100101 | 37 |
| 165 | 165 | 10100101 | 10100101 | 165 |
| 166 | 166 | 10100110 | 01100101 | 101 |
| 167 | 167 | 10100111 | 11100101 | 229 |
| 168 | 168 | 10101000 | 00010101 | 21 |
| 169 | 169 | 10101001 | 10010101 | 149 |
| 170 | 170 | 10101010 | 01010101 | 85 |
| 171 | 171 | 10101011 | 11010101 | 213 |
| 172 | 172 | 10101100 | 00110101 | 53 |
| 173 | 173 | 10101101 | 10110101 | 181 |
| 174 | 174 | 10101110 | 01110101 | 117 |
| 175 | 175 | 10101111 | 11110101 | 245 |
| 176 | 176 | 10110000 | 00001101 | 13 |
| 177 | 177 | 10110001 | 10001101 | 141 |
| 178 | 178 | 10110010 | 01001101 | 77 |
| 179 | 179 | 10110011 | 11001101 | 205 |
| 180 | 180 | 10110100 | 00101101 | 45 |
| 181 | 181 | 10110101 | 10101101 | 173 |
| 182 | 182 | 10110110 | 01101101 | 109 |
| 183 | 183 | 10110111 | 11101101 | 237 |
| 184 | 184 | 10111000 | 00011101 | 29 |
| 185 | 185 | 10111001 | 10011101 | 157 |
| 186 | 186 | 10111010 | 01011101 | 93 |
| 187 | 187 | 10111011 | 11011101 | 221 |
| 188 | 188 | 10111100 | 00111101 | 61 |
| 189 | 189 | 10111101 | 10111101 | 189 |
| | ~~190~~ | ~~10111110~~ | ~~01111101~~ | ~~125~~ |
| | ~~191~~ | ~~10111111~~ | ~~11111101~~ | ~~253~~ |
| | ~~192~~ | ~~11000000~~ | ~~00000011~~ | ~~3~~ |
| | ~~193~~ | ~~11000001~~ | ~~10000011~~ | ~~131~~ |
| 190 | 194 | 11000010 | 01000011 | 67 |
| 191 | 195 | 11000011 | 11000011 | 195 |
| 192 | 196 | 11000100 | 00100011 | 35 |
| 193 | 197 | 11000101 | 10100011 | 163 |
| 194 | 198 | 11000110 | 01100011 | 99 |
| 195 | 199 | 11000111 | 11100011 | 227 |
| 196 | 200 | 11001000 | 00010011 | 19 |
| 197 | 201 | 11001001 | 10010011 | 147 |
| 198 | 202 | 11001010 | 01010011 | 83 |
| 199 | 203 | 11001011 | 11010011 | 211 |
| 200 | 204 | 11001100 | 00110011 | 51 |
| 201 | 205 | 11001101 | 10110011 | 179 |
| 202 | 206 | 11001110 | 01110011 | 115 |
| 203 | 207 | 11001111 | 11110011 | 243 |
| 204 | 208 | 11010000 | 00001011 | 11 |
| 205 | 209 | 11010001 | 10001011 | 139 |
| 206 | 210 | 11010010 | 01001011 | 75 |
| 207 | 211 | 11010011 | 11001011 | 203 |
| 208 | 212 | 11010100 | 00101011 | 43 |
| 209 | 213 | 11010101 | 10101011 | 171 |
| 210 | 214 | 11010110 | 01101011 | 107 |
| 211 | 215 | 11010111 | 11101011 | 235 |
| 212 | 216 | 11011000 | 00011011 | 27 |
| 213 | 217 | 11011001 | 10011011 | 155 |
| 214 | 218 | 11011010 | 01011011 | 91 |
| 215 | 219 | 11011011 | 11011011 | 219 |
| 216 | 220 | 11011100 | 00111011 | 59 |
| 217 | 221 | 11011101 | 10111011 | 187 |
| | ~~222~~ | ~~11011110~~ | ~~01111011~~ | ~~123~~ |
| | ~~223~~ | ~~11011111~~ | ~~11111011~~ | ~~251~~ |
| | ~~224~~ | ~~11100000~~ | ~~00000111~~ | ~~7~~ |
| 218 | 225 | 11100001 | 10000111 | 135 |
| 219 | 226 | 11100010 | 01000111 | 71 |
| 220 | 227 | 11100011 | 11000111 | 199 |
| 221 | 228 | 11100100 | 00100111 | 39 |
| 222 | 229 | 11100101 | 10100111 | 167 |
| 223 | 230 | 11100110 | 01100111 | 103 |
| 224 | 231 | 11100111 | 11100111 | 231 |
| 225 | 232 | 11101000 | 00010111 | 23 |
| 226 | 233 | 11101001 | 10010111 | 151 |
| 227 | 234 | 11101010 | 01010111 | 87 |
| 228 | 235 | 11101011 | 11010111 | 215 |
| 229 | 236 | 11101100 | 00110111 | 55 |
| 230 | 237 | 11101101 | 10110111 | 183 |
| 231 | 238 | 11101110 | 01110111 | 119 |
| | ~~239~~ | ~~11101111~~ | ~~11110111~~ | ~~247~~ |
| 232 | 240 | 11110000 | 00001111 | 15 |
| 233 | 241 | 11110001 | 10001111 | 143 |
| 234 | 242 | 11110010 | 01001111 | 79 |
| 235 | 243 | 11110011 | 11001111 | 207 |
| 236 | 244 | 11110100 | 00101111 | 47 |
| 237 | 245 | 11110101 | 10101111 | 175 |
| 238 | 246 | 11110110 | 01101111 | 111 |
| 239 | 247 | 11110111 | 11101111 | 239 |
| 240 | 248 | 11111000 | 00011111 | 31 |
| 241 | 249 | 11111001 | 10011111 | 159 |
| 242 | 250 | 11111010 | 01011111 | 95 |
| 243 | 251 | 11111011 | 11011111 | 223 |
| 244 | 252 | 11111100 | 00111111 | 63 |
| 245 | 253 | 11111101 | 10111111 | 191 |
| | ~~254~~ | ~~11111110~~ | ~~01111111~~ | ~~127~~ |
| | ~~255~~ | ~~11111111~~ | ~~11111111~~ | ~~255~~ |

Table 1 illustrates an example logical mapping table for a 20 MHz symbol with a 4× symbol duration based on truncated bit reversal mapping. This logical mapping table assumes that tone indices [0:10] and [246:255] are the DC and 14 left over tones and tone indices [123:133] are the guard tones. DC tones, guard tones, and center block tones may be excluded from mapping. The usable tone indices in the range [11:122] and [134:245] have been logically mapped. Like in FIG. 6, Table 1 illustrate various distributed tone indices (and their corresponding binary values and other related values) that are crossed out. The values in these rows are crossed out (e.g., distributed tone index 4) because the distributed tone index corresponds to an unusable tone index (e.g. DC tone or guard tone) that may be precluded from being mapped. Other configurations of DC tones and guard tones may also be used, which may yield a different usable tone indices range.

In an aspect, truncated bit reversal mapping may not impose extra delay in receiver processing by using an FFT input/output sequence's indexing change. Also, pilot tones from different resource blocks may be well spread out due to the property of bit reversal permutation, which may result in processing gain when using downlink common pilots.

FIG. 7 illustrates diagrams 700, 750, 780 that show an exemplary tone index mapping for implementing distributed tone mapping using a row-column interleaver function. FIG. 7 assumes that tone indices [0:10] and [123:133] are unusable, and thus, the total number of usable tones (e.g., on usable tone indices [11:122] and [134:245]) that may be distributed can be written as number of tones=P*Q. The usable nominal tone indices, [11:122] and [134:245] may be written, row by row, into a matrix of dimension P*Q, and then read out column by column to determine the distributed tone indices (or the set of physical tone indices that map to the set of nominal tone indices). For example, the diagram 700 illustrates the usable tone indices for a 20 MHz symbol with a 4× symbol duration in which usable nominal tone indices are in the range of [11:122] and [134:245]. The usable nominal tone indices have been written into a 7*32 matrix. In this matrix, the dimensions correspond to the number of TAUs (or resource blocks) and the number of tones in each TAU (or a resource block size). That is, P=7 and Q=32. As shown previously in FIG. 5, a 20 MHz symbol with 4× symbol duration may have 7 32-tone TAUs. In this example, each of the nominal tone indices has been written into the 7*32 matrix of 7 rows and 32 columns.

To determine the logical tone index mapping, the interleaver matrix may be read column by column to determine the nominal tone index that maps to the corresponding physical tone index along each row. For example, reading the matrix down the first column, the nominal tone index 11 corresponds to the physical tone index 11. The nominal tone index 43 corresponds to the physical tone index 12. The nominal tone index 75 corresponds to the physical tone index 13. The nominal tone index 107 corresponds to the physical tone index 14 and so on. After reading the interleaver matrix, a table may be created that maps each of the nominal tone indices with each of the physical tone indices.

Diagrams 750 and 780 illustrate exemplary TAUs that may be allocated to an AP or a STA. In diagram 750, as an example, TAU1 has been allocated to an AP, and TAU1 has 32 nominal tone indices mapped to 32 physical tone indices based on the interleaver matrix in diagram 700. Similarly, in diagram 780, as an example, TAU2 has been allocated to a STA, and TAU2 has 32 nominal tone indices logically mapped to 32 physical tone indices based on the interleaver matrix in diagram 700. In other instances, TAU1 and TAU2 may have more or less tone indices. TAU1 and TAU2 may both be allocated to an AP or a STA. Moreover, in this instance, the interleaver matrix in diagram 700 may support up to 7 TAUs. However, in other instances, an interleaver matrix of a different size may support a different number of TAUs.

In an example, the AP 202 may allocate a number of resource blocks (e.g., TAU1, TAU2) for wireless communication. TAU1 may be allocated to the AP 202, and TAU2 may be allocated to the STA 212. With respect to TAU1, diagram 750 shows the set of physical tone indices that corresponds to the set of nominal tone indices, in which both sets of tone indices are associated with TAU1. The physical set of tone indices are based on an interleaver matrix function of the set of nominal tone indices. In diagram 780, assuming that TAU2 has been allocated to the STA 212 (additional TAUs may be allocated to STA 212 and other STAs), the diagram 780 shows the set of physical tone indices that that corresponds to the set of nominal tone indices associated with TAU2.

Continuing with the example, if the AP 202 transmits data packets to the STA 212 using the allocated resource block TAU1, the AP 202 may be allocated the set of nominal tone indices [11:42], but any data packet transmissions over TAU1 will actually be transmitted over the logically mapped set of physical tone indices 11, 18, 25, 32, 39, 46, 53, 60, 67, 74, 81, 88, 95, 102, 109, 116, 134, 141, 148, 155, 162, 169, 176, 183, 190, 197, 204, 211, 218, 225, 232, 239. That is, the logical mapping may be transparent to the transmitting wireless device (the AP 202 or the STA 212).

The STA 212 may receive the data packets over the set of physical tone indices corresponding to the TAU1. Using the interleaver matrix shown in diagram 700, the STA 212 may generate a mapping table (e.g., diagram 750) in order to de-map the set of physical tone indices on which the data packets were transmitted back to the set of nominal tone indices. Having de-mapped the set of physical tone indices back to the set of nominal tone indices, the STA 212 may reorder the data packets.

Similar to the AP 202, the STA 212 may be allocated a resource block for transmission. As shown in diagram 780, the STA 212, for example, may be allocated TAU2 for uplink transmission to the AP 202. The AP 202 may transmit the allocation information to the STA 212 in a trigger message 216. The allocation information may include an identifier. In one configuration, the identifier may correspond to a resource block number. For example, for TAU2, the identifier may be equal to 2. For TAU1, the identifier may be equal to 1, etc. The STA 212 may receive the allocation information related to the allocated resource block TAU2 (e.g., identifier equal to 2) and determine a set of physical tone indices associated with TAU2. To determine the set of physical tone indices associated with TAU2, in one configuration, the STA 212 may determine an interleaver matrix according to a bandwidth size (e.g., the interleaver matrix in diagram 700 is determined according to a bandwidth for a 20 MHz, 4× symbol). Having determined the interleaver matrix, the STA 212 may identify the set of nominal tone indices associated with the resource block associated with the received identifier in the trigger message 216. Using the set of nominal tone indices, the STA 212 may determine or identify the set of physical tone indices that correspond to (or are logically mapped to) the set of nominal tone indices. Then, the STA 212 may transmit data packets on TAU2 over the set of physical tone indices associated with TAU2. In another configuration, the STA 212 may have a mapping table based on the interleaver matrix in which, for each resource block, the set of nominal tone indices is mapped to the corresponding set of physical tone indices. Upon receiving the identifier corresponding to a particular resource block, the STA 212 may use the mapping table to determine the set of nominal tone indices and the set of physical tone indices associated with the particular resource block.

With respect to row-column interleaver mapping, in one configuration, if pilots have a fixed location in each resource block, then the pilots from the same resource block will be evenly spread over the whole bandwidth. Pilots from different resource blocks, or different users, may cluster together. This arrangement may be beneficial for uplink OFDMA. In another configuration, if walking pilots are used in the resource blocks (e.g., the pilot do not have a fixed location in each resource block), then the pilots from different resource blocks may be more evenly distributed over the entire bandwidth rather than being clustered together. This scenario may be beneficial to single users or downlink users so that single users and downlink users may enjoy the processing gain from using common pilots.

Row-column interleaver matrix mapping is different from binary convolution code (BCC) bit-interleaver in that the input into the row-column interleaver matrix used for logical mapping is a tone index rather than coded bits. Moreover, the tones that need to be distributed include both data tones and pilot tones instead of just data tones.

Although FIG. 7, and specifically diagram 700, depicts the logical mapping with respect to a 20 MHz, 4× symbol tone plan having a certain usable range of tone indices, similar mapping may be used for other ranges of tone indices and for a 40 MHz and 70 MHz, 4× tone plan. In those bandwidths, there may be 32*15 and 32*31 tones, respectively. The respective interleaver matrices may have dimensions 15*32 and 31*32, with each row filled by the nominal tone indices in a resource block. Similar mappings for different symbol durations may also be used.

FIG. 8 illustrates diagrams 800, 830, 860 that show an exemplary tone index mapping using distance based logical mapping. Distance based logical mapping may be applicable to usable tones. DC tones, guard tones, and other special blocks may not be included in the mapping. In distance based logical mapping, the set of physical tone indices is also based on the set of nominal tone indices. To determine the set of physical tone indices, an intermediary set of indices is first determined. The intermediary set of indices may be determined according to the following equation:

intermediary index=$i*D_m+k$

In the above equation, i is the local tone index associated with a resource block. For a resource block with 32 tones, i may have a value from 0 to 31. $D_m$ is the mapping distance, and, in one configuration, $D_m$ may be determined by the populating distance (or the distance between adjacent tones that belong to the same resource block/user such that the total per user transmit power in not limited by a PSD limitation. If the mapping distance is determined by the populating distance, then distance based logical mapping may be independent of the number of users. In another configuration, $D_m$ may be determined by the number of resource blocks or the number of users such that the mapping is tone plan allocation dependent or user dependent. For example, if there are 7 users, $D_m$ may be equal to 7, and k may be the resource block or user index that may be used as an offset value. In a 20 MHz, 4× symbol, in which 7 TAUs are allocated with 32 tones each, k may have a value from 0 to 6. The intermediary index may be an index array whose values correspond to an index position in the set of nominal indices.

Referring back to FIG. 8, diagram 800 illustrates how distance based logical mapping may be performed with respect to TAU1 in a 20 MHz, 4× symbol in which 7 TAUs are allocated with 32 tones. In diagram 800, the first column represents the set of nominal tone indices associated with TAU1. The second column represents the values for i. The third column represents the corresponding intermediary array of indices. And the fourth column represents the set of physical tone indices determined based on the intermediary index array and the set of nominal tone indices. In diagram 800, for i=0-31 and k=0, the intermediary index is 0, 7, 14, 21, . . . , 217. Each value in the intermediary index corresponds to an index position in the set of nominal tone indices. For example, intermediary index 0 corresponds to a first tone index in the set of nominal tone indices. For a 20 MHz, 4× symbol, the first usable tone index is 11. Similarly, intermediary index 7 corresponds to an eighth tone index in the set of nominal tone indices, which is equal to 18. Intermediary index 14 corresponds to a fifteenth tone index in the set of nominal tone indices, which is equal to 25. Likewise, intermediary index 112 corresponds to the one hundred and thirteenth tone index in the set of nominal tone indices, which is equal to 134.

In some cases, the intermediary index may exceed the maximum distributed tone index (e.g., when $D_m$=8, i=31, and k=6, intermediary index=254, assuming a maximum distributed tone index of 245). In this case, a modulo operation may be performed with respect to the intermediary index and the maximum distributed tone index, and the new intermediary index may be the result of the modulo operation (e.g., new intermediary index=modulo(254,245)=9). A physical tone index can be determined based on the new intermediary index, in which the new physical tone index is equal to the nominal tone index with an index position equal to the new intermediary index (e.g., if new intermediary index=9, the new physical tone index=19). This operation may violate the power spectrum density limitation because more tones may be populated in certain tone indices if data is transmitted at the peak power. For a subband in 20 MHz, the mapping used to distribute across the 20 MHz using a mapping distance of 4 ($D_m$) may almost violate the PSD limit. Moreover, if a mapping distance of 8 ($D_m$) is used, due to a large amount of power on each of the populated tones, the PSD limit will be surpassed as shown above. For subbands 40 MHz and 80 MHz, however, any mapping distance is safe to use due to the large number of populated tones that may be used to share the total power.

In an example, the AP 202 may allocate a number of resource blocks (e.g., TAU1, TAU2, . . . , TAU7) for wireless communication. TAU1 may be allocated to the AP 202, and TAU2 may be allocated to the STA 212. With respect to TAU1, diagram 800 shows the set of physical tone indices that corresponds to the set of nominal tone indices, in which both sets of tone indices are associated with TAU1. The set of nominal tone indices is mapped to a corresponding tone index in the second set of tone indices based on an equation for determining an intermediary index, as discussed above. In one configuration, assuming the AP 202 is allocated TAU1, which is a resource block that corresponds to a 20 MHz, 4× symbol, the set of nominal tone indices has a range of [11:42]. Using the aforementioned equation, the AP 202 may determine an intermediary array of indices that correspond to the tone indices positions in the set of nominal tone indices. With that information, the AP 202 may determine each corresponding physical tone index with respect to each nominal tone index. In another configuration, the AP 202 may have a preconfigured mapping table that maps each nominal tone index to a corresponding physical tone index. Having determined a set of physical tone indices, the AP 202 may transmit data packets on TAU1, in which the data packets transmitted on the set of nominal tone indices will actually be transmitted on the set of physical tone indices.

Continuing with the example, the STA 212 may receive the data packets over the set of physical tone indices corresponding to the TAU1. Based on the intermediary index formula discussed above, the STA 212 may de-map the set of physical tone indices on which the data packets were transmitted back to the set of nominal tone indices. To do so, the STA 212 may determine the index position of the nominal tone index that corresponds to the physical tone index on which each data packet was received. The STA 212 may subtract the index position of the nominal tone index by an offset value (e.g., the value of k), and then divide the difference by a scaling factor (e.g., the scaling factor, $D_m$).

The STA 212 may then reorder the data packets based on the determined second set of tone indices (nominal tone indices).

Similar to the AP 202, the STA 212 may be allocated a resource block for transmission. As shown in diagram 830, the STA 212, for example, may be allocated TAU2 for uplink transmission to the AP 202. Additional TAUs may be allocated to the STA 212 and other STAs. The AP 202 may transmit the allocation information to the STA 212 in a trigger message 216. The allocation information may include at least one of an identifier (e.g., an identifier corresponding to the resource block number 2 for TAU2), a resource block size (e.g., a number related to the number of usable tones in a resource block), or a set of nominal tone indices corresponding to the resource block (e.g., [43:74] for TAU2). The STA 212 may receive the allocation information related to the allocated resource block TAU2 and determine a set of physical tone indices associated with TAU2. In one configuration, if only an identifier associated with the resource block is included in the allocation information, then resource block size may be preconfigured and known to the STA 212. The scaling factor is also preconfigured within the STA 212. Accordingly, the set of nominal tone indices may also be known to the STA. As such, using the identifier, the STA may calculate the intermediary index, and with the intermediary index, determine the set of physical tone indices. In another configuration, the resource block size may be variable. In this configuration, the STA 212 may receive an identifier associated with the resource block along with a resource block size. In an aspect, the $D_m$ scaling factor is preconfigured within the STA 212. In this configuration, the STA 212 may calculate the intermediary index array based on the resource block size, the scaling factor $D_m$, and the identifier. Then, using the intermediary index array, the STA 212 may determine the set of physical tone indices corresponding to TAU2. Having determined the set of physical tone indices corresponding to TAU2, the STA 212 may transmit data packets in TAU 2 to the AP 202.

The advantage of distance based logical mapping is that there is simple direct-de-mapping procedure. No buffering and waiting is needed as each physical tone index may be immediately de-mapped back to the nominal tone index. For pilot tones, if the pilots are in a fixed location in each resource block, then the pilots from the same block will be evenly spread over the whole bandwidth, and pilots from different resource blocks or different users would cluster together. This is beneficial for uplink OFDMA. If walking pilots are used in resource blocks and pilot locations vary from block to block, then the pilots from different resource blocks would be more evenly distributed over the entire bandwidth rather than clustering together. This would be beneficial to single user or downlink users because single users and downlink users would be able to take advantage of the processing gain from using common pilots.

Figure 9:
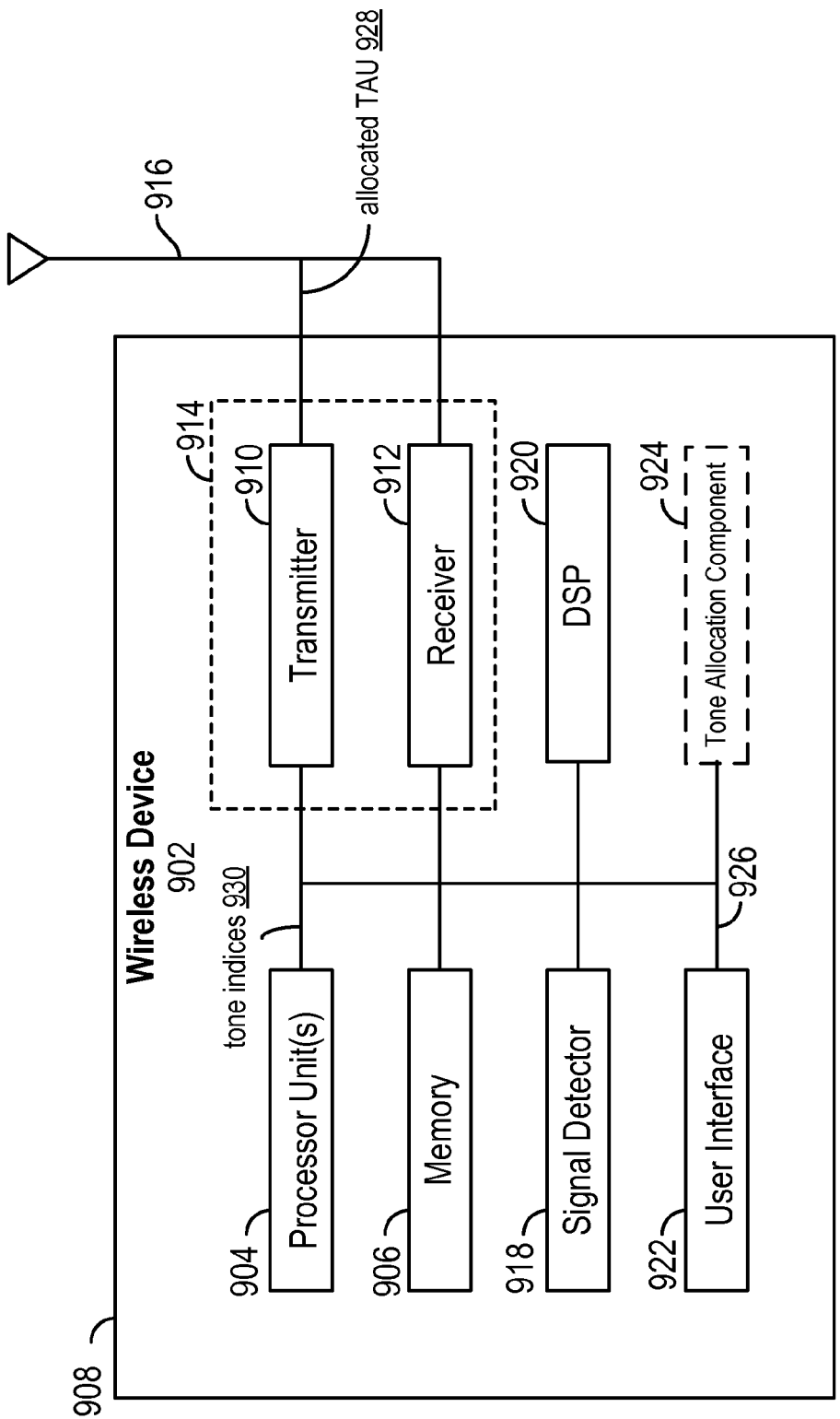
FIG. 9 is a functional block diagram of a wireless device that may be employed within the wireless communication system of FIG. 1 for transmitting on tone mapped resource blocks and allocating tone mapped resource blocks.

FIG. 9 is a functional block diagram of a wireless device 902 that may be employed within the wireless communication system 100 of FIG. 1 for transmitting on tone mapped resource blocks and allocating tone mapped resource blocks. The wireless device 902 is an example of a device that may be configured to implement the various methods described herein. For example, the wireless device 902 may be the AP 104 or the AP 202.

The wireless device 902 may include a processor 904 which controls operation of the wireless device 902. The processor 904 may also be referred to as a central processing unit (CPU). Memory 906, which may include both read-only memory (ROM) and random access memory (RAM), may provide instructions and data to the processor 904. A portion of the memory 906 may also include non-volatile random access memory (NVRAM). The processor 904 typically performs logical and arithmetic operations based on program instructions stored within the memory 906. The instructions in the memory 906 may be executable (by the processor 904, for example) to implement the methods described herein.

The processor 904 may comprise or be a component of a processing system implemented with one or more processors. The one or more processors may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 902 may also include a housing 908, and the wireless device 902 that may include a transmitter 910 and/or a receiver 912 to allow transmission and reception of data between the wireless device 902 and a remote device. The transmitter 910 and the receiver 912 may be combined into a transceiver 914. An antenna 916 may be attached to the housing 908 and electrically coupled to the transceiver 914. The wireless device 902 may also include multiple transmitters, multiple receivers, multiple transceivers, and/or multiple antennas.

The wireless device 902 may also include a signal detector 918 that may be used to detect and quantify the level of signals received by the transceiver 914 or the receiver 912. The signal detector 918 may detect such signals as total energy, energy per subcarrier per symbol, power spectral density, and other signals. The wireless device 902 may also include a digital signal processor (DSP) 920 for use in processing signals. The DSP 920 may be configured to generate a packet for transmission. In some aspects, the packet may comprise a physical layer convergence procedure (PLCP) protocol data unit (PPDU).

The wireless device 902 may further comprise a user interface 922 in some aspects. The user interface 922 may comprise a keypad, a microphone, a speaker, and/or a display. The user interface 922 may include any element or component that conveys information to a user of the wireless device 902 and/or receives input from the user.

When the wireless device 902 is implemented as an AP (e.g., AP 104, AP 202), the wireless device 902 may also comprise a tone allocation component 924. The tone allocation component 924 may be configured to allocate a plurality of resource blocks (e.g., allocated TAU 928) for wireless communication. The tone allocation component 924 may be configured to transmit, via the transmitter 910 or the transceiver 914, data on a first resource block of the plurality of resource blocks, in which the first resource block may be associated with a first set of tone indices (e.g., tone indices 930) and a second set of tone indices. The first set of tone indices may be a set of nominal tone indices that is logically mapped to a second set of tone indices that is a set of physical tone indices. In an aspect, the second set of tone indices may be based on bit reversal function of a third set of tone indices, the second set of tone indices may not include direct current tones and guard tones, and the first set of tone indices represents a natural order of the second set of tone indices. In another aspect, the second set of tone indices may be based on an interleaver matrix function of the first set of tone indices, and an input into the interleaver matrix function may be a set of tone indices. In another aspect, each tone index in the first set of tone indices may be mapped to a corresponding tone index in the second set of tone indices based on an equation, $f(x)=i*D_m+k$, in which i is a local tone index associated with the first resource block, $D_m$ is a scaling factor, k is a resource block number associated with the first resource block, and f(x) is an index position related to the first set of tone indices. In this aspect, the corresponding tone index in the second set of tone indices may correspond to a tone index in the first set of tone indices having the index position of f(x). In another aspect, when f(x) is greater than a MaxToneIndex, the MaxToneIndex may represent a maximum distributed tone index, f(x) may be determined by a second equation, mod(f(x),MaxToneIndex), and the corresponding tone index in the second set of tone indices may correspond to a tone index in the first set of tone indices having the index position equal to mod(f(x), MaxToneIndex). In another configuration, the tone allocation component 924 may be configured to transmit allocation information related to a second resource block, in which the second resource block may be associated with a third set of tone indices and a fourth set of tone indices, the third set of tone indices may be a set of nominal tone indices that is logically mapped to the fourth set of tone indices that is a set of physical tone indices, and the allocation information may include at least one of the third set of tone indices, an identifier, a resource block size, or the fourth set of tone indices. In another configuration, the tone allocation component 924 may be configured to receive a plurality of data packets from a wireless device over a third set of tone indices associated with a second resource block, in which each data packet of the plurality of data packets is received over a tone index of the third set of tone indices, and to determine a fourth set of tone indices associated with the second resource block based on the third set of tone indices, in which the third set of tone indices is a set of physical tone indices that is logically mapped to the fourth set of tone indices that is a set of nominal tone indices. In another configuration, the tone allocation component 924 may be configured to reorder the received plurality of data packets based on the fourth set of tone indices. The tone allocation component 924 may be configured to reorder by determining a tone index in the third set of tone indices on which each data packet of the plurality of data packets was received, by determining a corresponding tone index in the fourth set of tone indices for each tone index on which each data packet of the plurality of data packets was received, and by rearranging the plurality of data packets based an order of each corresponding tone index in the fourth set of tone indices. In another configuration, the tone allocation component 924 may be configured to determine the fourth set of tone indices by determining a fifth set of tone indices based on the third set of tone indices and by comparing the fifth set of tone indices with a mapping table, in which the mapping table maps the fifth set of tone indices to the fourth set of tone indices. In another aspect, the fourth set of tone indices is determined based on an interleaver matrix function and the third set of tone indices. In another configuration, the tone allocation component 924 may be configured to determine the fourth set of tone indices, for each tone index in the third set of tone indices, by determining an index position of a corresponding tone index in the fourth set of tone indices subtracting the index position by an offset value and by dividing the difference by a scaling factor.

The various components of the wireless device 902 may be coupled together by a bus system 926. The bus system 926 may include a data bus, for example, as well as a power bus, a control signal bus, and a status signal bus in addition to the data bus. Components of the wireless device 902 may be coupled together or accept or provide inputs to each other using some other mechanism.

Although a number of separate components are illustrated in FIG. 9, one or more of the components may be combined or commonly implemented. For example, the processor 904 may be used to implement not only the functionality described above with respect to the processor 904, but also to implement the functionality described above with respect to the signal detector 918, the DSP 920, the user interface 922, and/or the tone allocation component 924. Further, each of the components illustrated in FIG. 9 may be implemented using a plurality of separate elements.

Figure 10:
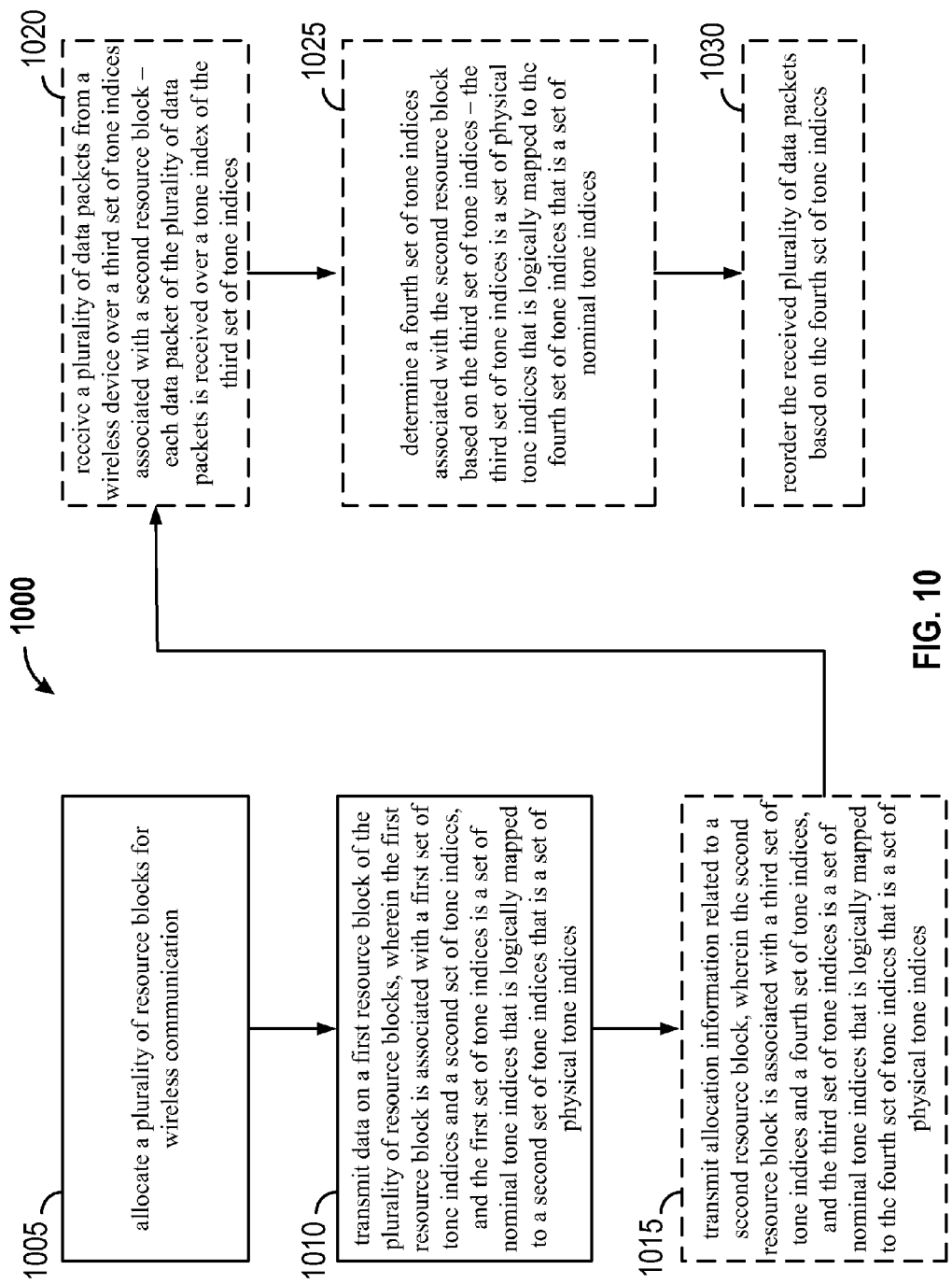
FIG. 10 is a flowchart of an exemplary method of wireless communication for transmitting on tone mapped resource blocks and allocating tone mapped resource blocks.

FIG. 10 is a flowchart of an exemplary method 1000 of wireless communication for transmitting on tone mapped resource blocks and allocating tone mapped resource blocks. The method 1000 may be performed using an apparatus (e.g., the AP 104 or the AP 202, for example). Although the method 1000 is described below with respect to the elements of wireless device 902 of FIG. 9, other components may be used to implement one or more of the steps described herein. In FIG. 10, the blocks indicated with dotted lines represent optional operations.

At block 1005, the apparatus may allocate a plurality of resource blocks for wireless communication. For example, referring to FIG. 2, the apparatus may be the AP 202. The AP 202 may determine an availability number of resource blocks for allocation and a number of wireless devices to which resource blocks may be allocated. The AP 202 may determine that TAU1-TAU7 are available for wireless communication. TAU1 may be allocated to the AP 202, TAU2 may be allocated to the STA 212, and the remaining TAU3-7 may be allocated to one or more other STAs.

At block 1010, the apparatus may transmit data on a first resource block of the plurality of resource blocks. The first resource block may be associated with a first set of tone indices and a second set of tone indices, and the first set of tone indices may be a set of nominal tone indices that is logically mapped to a second set of tone indices that is a set of physical tone indices. In a row-column interleaver example, the first resource block may be TAU1, and the first set of tone indices may be the nominal set of tone indices and the second set of tone indices may be the physical set of tone indices. As shown in diagram 750 of FIG. 7, the nominal set of tone indices is mapped to a physical set of tone indices.

At block 1015, the apparatus may transmit allocation information related to a second resource block. The second resource block may be associated with a third set of tone indices and a fourth set of tone indices, and the third set of tone indices is a set of nominal tone indices that is logically mapped to the fourth set of tone indices that is a set of physical tone indices. In an aspect, the allocation information may include at least one of the third set of tone indices, an identifier, a resource block size, or the fourth set of tone indices. In a row-column interleaver example, the second resource black may be TAU2, and the third set of tone indices may be the set of nominal tone indices associated with TAU2, and the fourth set of tone indices may be the set of physical tone indices associated with TAU2. As shown in diagram 780 of FIG. 7, the set of nominal tone indices associated with TAU2 is logically mapped to the set of physical tone indices associated with TAU2.

At block 1020, the apparatus may receive a plurality of data packets from a wireless device over a third set of tone indices associated with a second resource block. Each data packet of the plurality of data packets may be received over a tone index of the third set of tone indices.

At block 1025, the apparatus may determine a fourth set of tone indices associated with the second resource block based on the third set of tone indices. The third set of tone indices is a set of physical tone indices that is logically mapped to the fourth set of tone indices that is a set of nominal tone indices.

At block 1030, the apparatus may reorder the received plurality of data packets based on the fourth set of tone indices.

For example, referring to FIGS. 2 and 6, using a truncated bit reversal example, the AP 202 may receive a plurality of data packets from the STA 212 over a first set of physical tone indices 2, 6, 1 5, 7 (e.g., the third set of tone indices). Each of the data packets may be received over a tone index (e.g., tone index 2). The AP 202 may determine a set of nominal tone indices associated with the resource block (e.g., the second resource block). The set of physical tone indices may be logically mapped to the set of nominal tone indices. Having determined the set of nominal tone indices, the AP 202 may reorder or rearrange the data packets into the proper order intended by the STA 212. In this example, physical tone index 1 may have data packet 3. Physical tone index 2 may have data packet 1. Physical tone index 5 may have data packet 4. Physical tone index 6 may have data packet 2. And physical tone index 7 may have data packet 5. If the data packets were arranged according to the physical tone indices on which the data packets were sent, the order for the data packets would be data packets 3, 1, 4, 2, 5. As such the data packets would be out of order for decoding. By de-mapping to recover the set of nominal tone indices to which the set of physical tone indices is mapped, data packet 1 will be associated with nominal tone index 1, data packet 2 will be associated with nominal tone index 2, data packet 3 will be associated with nominal tone index 5, data packet 4 will be associated with nominal tone index 6, and data packet 5 will be associated with nominal tone index 7. Thus, if the data packets were arranged according to the nominal tone indices 1, 2, 5, 6, 7, the data packets would be in the order of data packet 1, 2, 3, 4, 5, which can be properly decoded.

Figure 11:
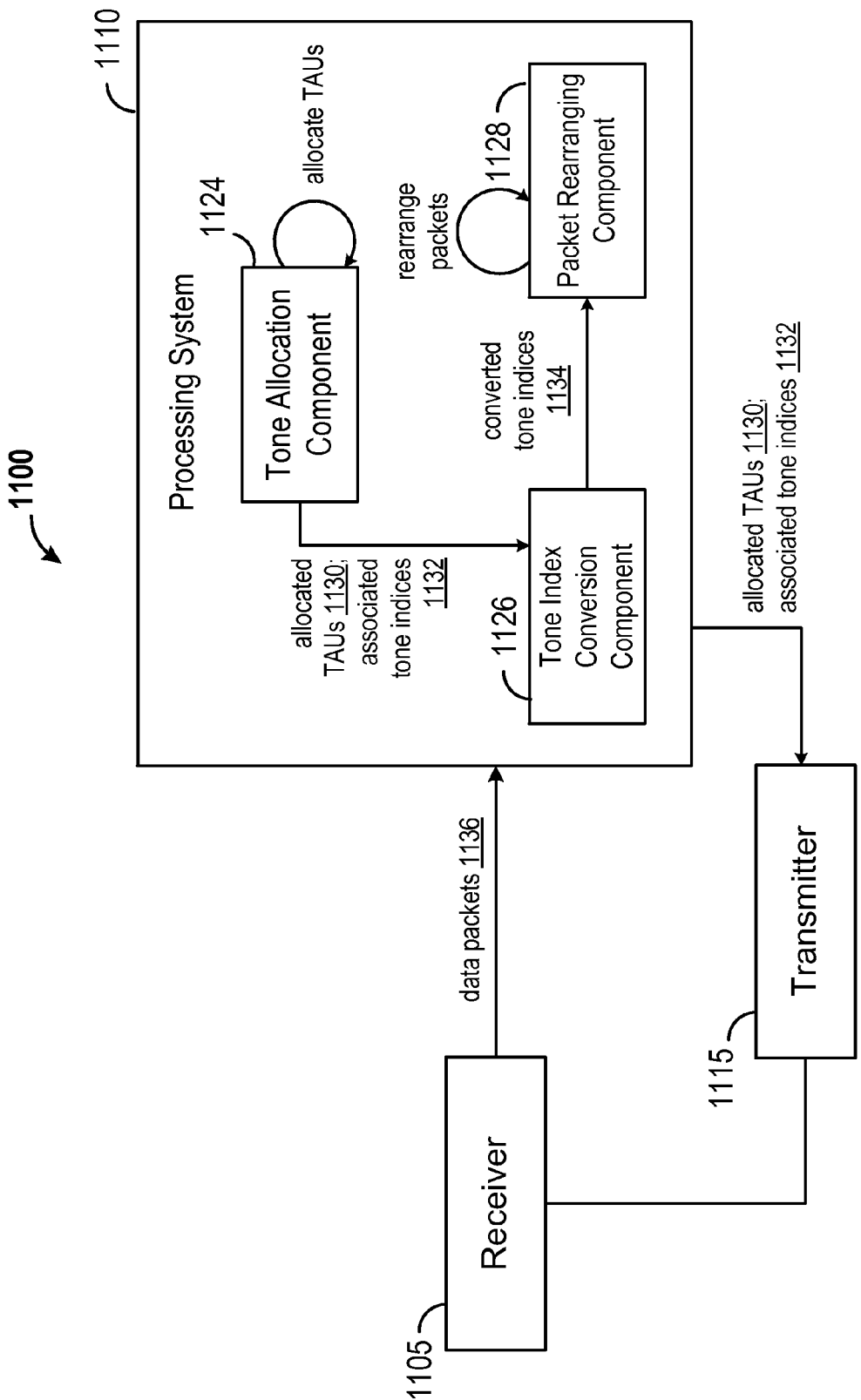
FIG. 11 is a functional block diagram of an exemplary wireless communication device for transmitting on tone mapped resource blocks and allocating tone mapped resource blocks.

FIG. 11 is a functional block diagram of an exemplary wireless communication device 1100 for transmitting on tone mapped resource blocks and allocating tone mapped resource blocks. The wireless communication device 1100 may include a receiver 1105, a processing system 1110, and a transmitter 1115. The processing system 1110 may include a tone allocation component 1124, a tone index conversion component 1126, and/or a packet rearranging component 1128. The tone allocation component 1124 and/or the processing system 1110 may be configured to allocate a plurality of resource blocks (e.g., allocated TAUs 1130) for wireless communication. The processing system 1110, the tone allocation component 1124, and/or the transmitter 1115 may be configured to transmit data on a first resource block of the plurality of resource blocks, in which the first resource block is associated with a first set of tone indices (e.g., associated tone indices 1132) and a second set of tone indices, and the first set of tone indices is a set of nominal tone indices that is logically mapped to a second set of tone indices that is a set of physical tone indices. In another aspect, the second set of tone indices is based on bit reversal function of a third set of tone indices, the second set of tone indices does not include direct current tones and guard tones, and the first set of tone indices represents a natural order of the second set of tone indices. In an aspect, the second set of tone indices is based on an interleaver matrix function of the first set of tone indices, and an input into the interleaver matrix function is a set of tone indices. In another aspect, each tone index in the first set of tone indices is mapped to a corresponding tone index in the second set of tone indices based on an equation, $f(x)=i*D_m+k$, in which i is a local tone index associated with the first resource block, $D_m$ is a scaling factor, k is a resource block number associated with the first resource block, and f(x) is an index position related to the first set of tone indices. In this aspect, the corresponding tone index in the second set of tone indices corresponds to a tone index in the first set of tone indices having the index position of f(x). In another aspect, f(x) is greater than a MaxToneIndex, MaxToneIndex represents a maximum distributed tone index, f(x) is determined by a second equation, mod(f(x), MaxToneIndex), and the corresponding tone index in the second set of tone indices corresponds to a tone index in the first set of tone indices having the index position equal to mod(f(x),MaxToneIndex). In another configuration, the processing system 1110, the tone allocation component 1124, and/or the transmitter 1115 may be configured to transmit allocation information related to a second resource block. In this configuration, the second resource block is associated with a third set of tone indices and a fourth set of tone indices, and the third set of tone indices is a set of nominal tone indices that is logically mapped to the fourth set of tone indices that is a set of physical tone indices. In this configuration, the allocation information includes at least one of the third set of tone indices, an identifier, a resource block size, or the fourth set of tone indices. In another configuration, the processing system 1110, the tone allocation component 1124, and/or the receiver 1105 may be configured to receive a plurality of data packets (e.g., data packets 1136) from a wireless device over a third set of tone indices associated with a second resource block, in which each data packet of the plurality of data packets is received over a tone index of the third set of tone indices. In this configuration, the processing system 1110, the tone allocation component 1124, and/or the tone index conversion component 1126 may be configured to determine a fourth set of tone indices (e.g., converted tone indices 1134) associated with the second resource block based on the third set of tone indices, in which the third set of tone indices is a set of physical tone indices that is logically mapped to the fourth set of tone indices that is a set of nominal tone indices. In another configuration, the processing system 1110, the tone allocation component 1124, and/or the packet rearranging component 1128 may be configured to reorder the received plurality of data packets based on the fourth set of tone indices. In this configuration, the processing system 1110, the tone allocation component 1124, the tone index conversion component 1126, and/or the packet rearranging component 1128 may be configured to reorder by determining a tone index in the third set of tone indices on which each data packet of the plurality of data packets was received, by determining a corresponding tone index in the fourth set of tone indices for each tone index on which each data packet of the plurality of data packets was received, and by rearranging the plurality of data packets based an order of each corresponding tone index in the fourth set of tone indices. In another configuration, the processing system 1110, the tone allocation component 1124, and/or the tone index conversion component 1126 may be configured to determine the fourth set of tone indices by determining a fifth set of tone indices based on the third set of tone indices and by comparing the fifth set of tone indices with a mapping table, in which the mapping table maps the fifth set of tone indices to the fourth set of tone indices. In an aspect, the fourth set of tone indices is determined based on an interleaver matrix function and the third set of tone indices. In another configuration, the processing system 1110, the tone allocation component 1124, and/or the tone index conversion component 1126 may be configured to determine the fourth set of tone indices, for each tone index in the third set of tone indices, by determining an index position of a corresponding tone index in the fourth set of tone indices, by subtracting the index position by an offset value, and by dividing the difference by a scaling factor.

The receiver 1105, the processing system 1110, the tone allocation component 1124, the tone index conversion component 1126, the packet rearranging component 1128, and/or the transmitter 1115 may be configured to perform one or more functions discussed above with respect to blocks 1005, 1010, 1015, 1020, 1025, and 1030 of FIG. 10. The receiver 1105 may correspond to the receiver 912. The processing system 1110 may correspond to the processor 904. The transmitter 1115 may correspond to the transmitter 910. The tone allocation component 1124 may correspond to the tone allocation component 124 and/or the tone allocation component 924.

In one configuration, the wireless communication device 1100 includes means for allocating a plurality of resource blocks for wireless communication. The wireless communication device 1100 includes means for transmitting data on a first resource block of the plurality of resource blocks. The first resource block may be associated with a first set of tone indices and a second set of tone indices, and the first set of tone indices may be a set of nominal tone indices that is logically mapped to a second set of tone indices that is a set of physical tone indices. In an aspect, the second set of tone indices may be based on bit reversal function of a third set of tone indices, and the second set of tone indices may not include direct current tones and guard tones, and the first set of tone indices may represent a natural order of the second set of tone indices. In another aspect, the second set of tone indices may be based on an interleaver matrix function of the first set of tone indices, and an input into the interleaver matrix function may be a set of tone indices. In another aspect, each tone index in the first set of tone indices may be mapped to a corresponding tone index in the second set of tone indices based on an equation, $f(x)=i*Dm+k$, in which i is a local tone index associated with the first resource block, Dm is a scaling factor, k is a resource block number associated with the first resource block, and $f(x)$ is an index position related to the first set of tone indices, and the corresponding tone index in the second set of tone indices may correspond to a tone index in the first set of tone indices having the index position of $f(x)$. In another aspect, when $f(x)$ is greater than a MaxToneIndex, the MaxToneIndex representing a maximum distributed tone index, $f(x)$ may be determined by a second equation, $mod(f(x),MaxToneIndex)$, and the corresponding tone index in the second set of tone indices may correspond to a tone index in the first set of tone indices having the index position equal to $mod(f(x),MaxToneIndex)$. In another configuration, the wireless communication device 1100 may include means for transmitting allocation information related to a second resource block. The second resource block may be associated with a third set of tone indices and a fourth set of tone indices, and the third set of tone indices may be a set of nominal tone indices that is logically mapped to the fourth set of tone indices that is a set of physical tone indices, and the allocation information may include at least one of the third set of tone indices, an identifier, a resource block size, or the fourth set of tone indices. In another configuration, the wireless communication device 1100 may include means for receiving a plurality of data packets from a wireless device over a third set of tone indices associated with a second resource block, in which each data packet of the plurality of data packets is received over a tone index of the third set of tone indices. In this configuration, the wireless communication device 1100 may include means for determining a fourth set of tone indices associated with the second resource block based on the third set of tone indices, in which the third set of tone indices may be a set of physical tone indices that is logically mapped to the fourth set of tone indices that is a set of nominal tone indices. In another configuration, the wireless communication device 1100 may include means for reordering the received plurality of data packets based on the fourth set of tone indices. In an aspect, the means for reordering may be configured to determine a tone index in the third set of tone indices on which each data packet of the plurality of data packets was received, to determine a corresponding tone index in the fourth set of tone indices for each tone index on which each data packet of the plurality of data packets was received, and to rearrange the plurality of data packets based an order of each corresponding tone index in the fourth set of tone indices. In another aspect, the means for determining the fourth set of tone indices may be configured to determine a fifth set of tone indices based on the third set of tone indices and to compare the fifth set of tone indices with a mapping table, in which the mapping table maps the fifth set of tone indices to the fourth set of tone indices. In another aspect, the fourth set of tone indices may be determined based on an interleaver matrix function and the third set of tone indices. In another aspect, the means for determining the fourth set of tone indices may be configured to, for each tone index in the third set of tone indices, determine an index position of a corresponding tone index in the fourth set of tone indices, to subtract the index position by an offset value, and to divide the difference by a scaling factor.

For example, means for allocating a plurality of resource blocks for wireless communication may comprise the processing system 1110 and/or the tone allocation component 1124. Means for transmitting data on a first resource block of the plurality of resource blocks may comprise the processing system 1110, the tone allocation component 1124, and/or the transmitter 1115. Means for transmitting allocation information related to a second resource block may comprise the processing system 1110, the tone allocation component 1124, and/or the transmitter 1115. Means for receiving a plurality of data packets may comprise the processing system 1110, the tone allocation component 1124, and/or the receiver 1105. Means for determining a fourth set of tone indices may comprise the processing system 1110, the tone allocation component 1124, and/or the tone index conversion component 1126. Means for reordering the received plurality of data packets may comprise the processing system 1110, the tone allocation component 1124, and/or the packet rearranging component 1128.

Figure 12:
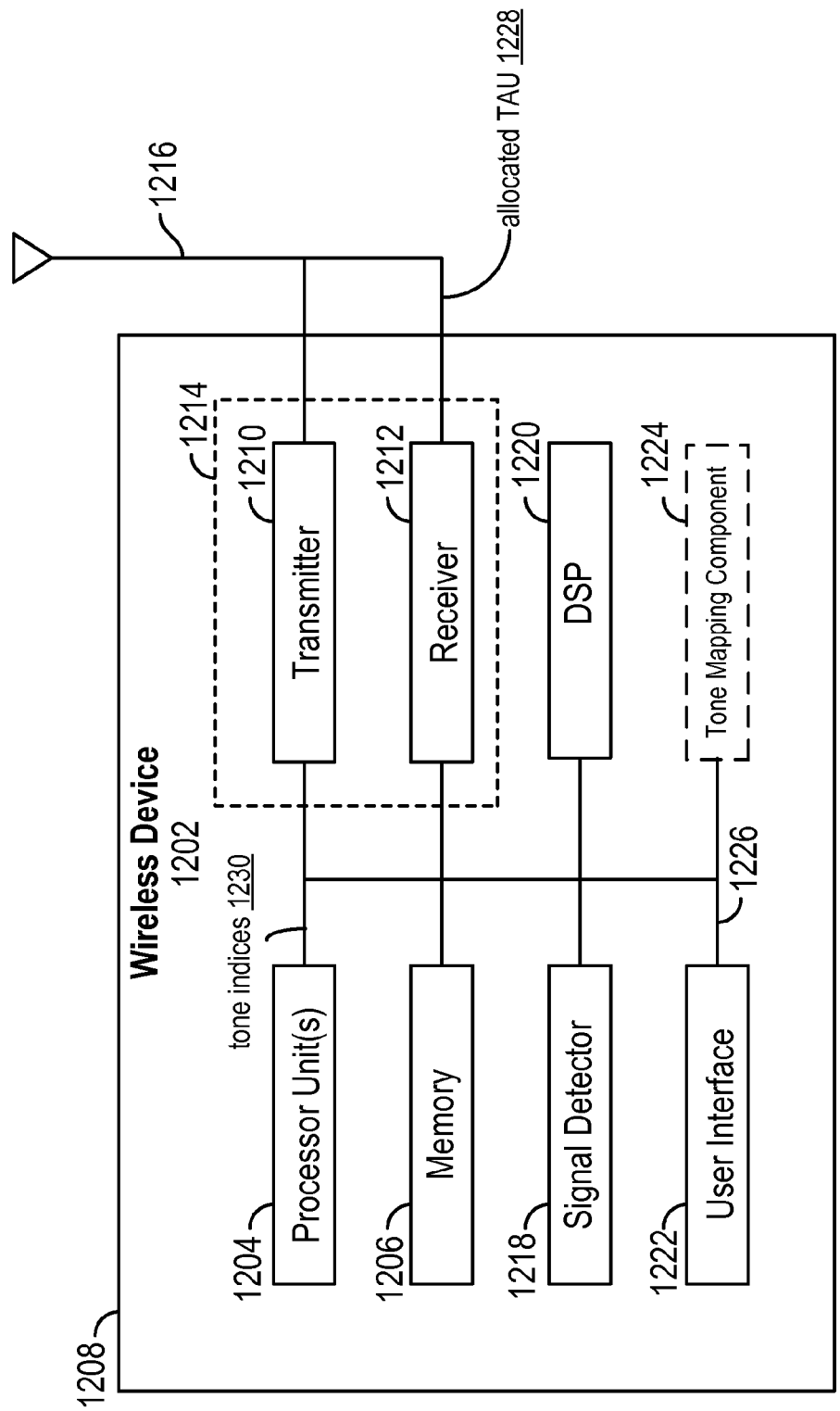
FIG. 12 is a functional block diagram of a wireless device that may be employed within the wireless communication system of FIG. 1 for transmitting on tone mapped resource blocks.

FIG. 12 is a functional block diagram of a wireless device 1202 that may be employed within the wireless communication system 100 of FIG. 1 for transmitting on tone mapped resource blocks. The wireless device 1202 is an example of a device that may be configured to implement the various methods described herein. For example, the wireless device 1202 may be the STAs 112, 114, 116, 118, or the STAs 206, 208, 210, 212.

The wireless device 1202 may include a processor 1204 which controls operation of the wireless device 1202. The processor 1204 may also be referred to as a CPU. Memory 1206, which may include both ROM and RAM, may provide instructions and data to the processor 1204. A portion of the memory 1206 may also include NVRAM. The processor 1204 typically performs logical and arithmetic operations based on program instructions stored within the memory 1206. The instructions in the memory 1206 may be executable (by the processor 1204, for example) to implement the methods described herein.

The processor 1204 may comprise or be a component of a processing system implemented with one or more processors. The one or more processors may be implemented with any combination of general-purpose microprocessors, microcontrollers, DSPs) FPGAs, PLDs, controllers, state machines, gated logic, discrete hardware components, dedicated hardware finite state machines, or any other suitable entities that can perform calculations or other manipulations of information.

The processing system may also include machine-readable media for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system to perform the various functions described herein.

The wireless device 1202 may also include a housing 1208, and the wireless device 1202 may include a transmitter 1210 and/or a receiver 1212 to allow transmission and reception of data between the wireless device 1202 and a remote device. The transmitter 1210 and the receiver 1212 may be combined into a transceiver 1214. An antenna 1216 may be attached to the housing 1208 and electrically coupled to the transceiver 1214. The wireless device 1202 may also include multiple transmitters, multiple receivers, multiple transceivers, and/or multiple antennas.

The wireless device 1202 may also include a signal detector 1218 that may be used to detect and quantify the level of signals received by the transceiver 1214 or the receiver 1212. The signal detector 1218 may detect such signals as total energy, energy per subcarrier per symbol, power spectral density, and other signals. The wireless device 1202 may also include a DSP 1220 for use in processing signals. The DSP 1220 may be configured to generate a packet for transmission. In some aspects, the packet may comprise a PPDU.

The wireless device 1202 may further comprise a user interface 1222 in some aspects. The user interface 1222 may comprise a keypad, a microphone, a speaker, and/or a display. The user interface 1222 may include any element or component that conveys information to a user of the wireless device 1202 and/or receives input from the user. When the wireless device 1202 is implemented as a STA (e.g., the STA 114, the STA 206), the wireless device 1202 may also comprise a tone mapping component 1224. The tone mapping component 1224 may be configured receive allocation information related to at least one allocated resource block (e.g., an allocated TAU 1228), via the receiver 1212 or the transceiver 1214. The tone mapping component 1224 may be configured to determine a first set of tone indices (e.g., tone indices 1230) associated with the at least one allocated resource block based on the received allocation information. The first set of tone indices may be a function of a second set of tone indices associated with the at least one allocated resource block. The first set of tone indices may be a set of physical tone indices, and the second set of tone indices may be a set of nominal tone indices. The tone mapping component 1224 may be configured to transmit data on the determined first set of tone indices associated with the at least one allocated resource block. In an aspect, the allocation information may include the second set of tone indices. In this aspect, the tone mapping component 1224 may be configured to determine the first set of tone indices by comparing each tone index in the second set of tone indices with a mapping table, in which the mapping table indicates which tone index from the first set of tone indices corresponds to each tone index in the second set of tone indices, and by identifying a tone index from the first set of tone indices that corresponds to each tone index in the second set of tone indices. In another configuration, the allocation information may include at least one identifier, and the at least one identifier may be associated with the at least one allocated resource block. In this configuration, the tone mapping component 1224 may be configured to determine the first set of tone indices by determining the first set of tone indices as a function of the at least one identifier. In another configuration, the tone mapping component 1224 may be configured to determine the first set of tone indices by determining an interleaver matrix according to a bandwidth size and by determining the first set of tone indices based on the interleaver matrix and the at least one identifier. In another configuration, the tone mapping component 1224 may be configured to receive a plurality of data packets from a wireless device over a third set of tone indices associated with a second resource block, in which each data packet of the plurality of data packets is received over a tone index of the third set of tone indices, and to determine a fourth set of tone indices associated with the second resource block based on the third set of tone indices, in which the third set of tone indices is a set of physical tone indices that is logically mapped to the fourth set of tone indices that is a set of nominal tone indices. In another configuration, the tone mapping component 1224 may be configured to reorder the received plurality of data packets based on the fourth set of tone indices. The tone mapping component 1224 may be configured to reorder by determining a tone index in the third set of tone indices on which each data packet of the plurality of data packets was received, by determining a corresponding tone index in the fourth set of tone indices for each tone index on which each data packet of the plurality of data packets was received, and by rearranging the plurality of data packets based an order of each corresponding tone index in the fourth set of tone indices. In another configuration, the tone mapping component 1224 may be configured to determine the fourth set of tone indices by determining a fifth set of tone indices based on the third set of tone indices and by comparing the fifth set of tone indices with a mapping table, in which the mapping table maps the fifth set of tone indices to the fourth set of tone indices. In another aspect, the fourth set of tone indices is determined based on an interleaver matrix function and the third set of tone indices. In another configuration, the tone mapping component 1224 may be configured to determine the fourth set of tone indices, for each tone index in the third set of tone indices, by determining an index position of a corresponding tone index in the fourth set of tone indices subtracting the index position by an offset value and by dividing the difference by a scaling factor.

The various components of the wireless device 1202 may be coupled together by a bus system 1226. The bus system 1226 may include a data bus, for example, as well as a power bus, a control signal bus, and a status signal bus in addition to the data bus. Components of the wireless device 1202 may be coupled together or accept or provide inputs to each other using some other mechanism.

Although a number of separate components are illustrated in FIG. 12, one or more of the components may be combined or commonly implemented. For example, the processor 1204 may be used to implement not only the functionality described above with respect to the processor 1204, but also to implement the functionality described above with respect to the signal detector 1218, the DSP 1220, the user interface 1222, and/or the tone mapping component 1224. Further, each of the components illustrated in FIG. 12 may be implemented using a plurality of separate elements.

Figure 13:
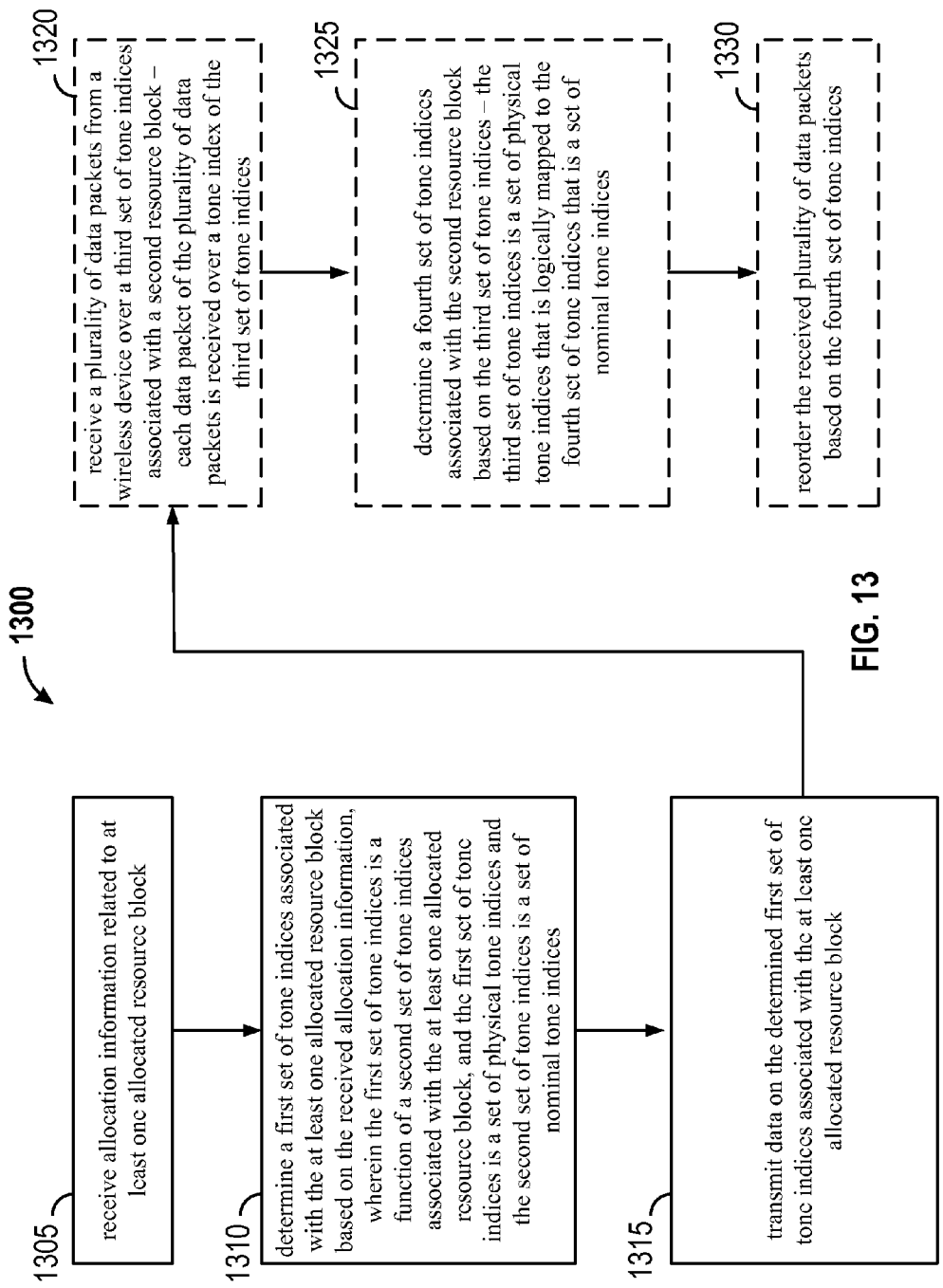
FIG. 13 is a flowchart of an exemplary method of wireless communication for transmitting on tone mapped resource blocks.

FIG. 13 is a flowchart of an exemplary method 1300 of wireless communication for transmitting on tone mapped resource blocks. The method 1300 may be performed using an apparatus (e.g., the STA 113, the STA 206, or the wireless device 1202, for example). Although the method 1300 is described below with respect to the elements of wireless device 1202 of FIG. 12, other components may be used to implement one or more of the steps described herein. In FIG. 13, the blocks indicated with dotted lines represent optional operations.

At block 1305, the apparatus may receive allocation information related to at least one allocated resource block. For example, referring to FIG. 2, the apparatus may be the STA 212. The STA 212 may receive a trigger message 216 from the AP 202. The trigger message 216 may indicate a resource block (e.g., an index associated with a resource block) that has been allocated to the STA 212.

At block 1310, the apparatus may determine a first set of tone indices associated with the at least one allocated resource block based on the received allocation information. The first set of tone indices may be a function of a second set of tone indices associated with the at least one allocated resource block. The first set of tone indices may be a set of physical tone indices and the second set of tone indices may be a set of nominal tone indices. In a truncated bit reversal example, the STA 212 may receive a trigger message 216 from the AP 202 indicating a set of nominal tone indices [11:42]. The STA 212 may compare each tone index in the set of nominal tone indices with a mapping table. The mapping table may indicate which tone index from the set of physical tone indices (e.g., distributed tone indices in Table 1), corresponds to each of the nominal tone indices. The STA 212 may then identify a tone index from the set of physical tone indices based on the comparison.

At block 1315, the apparatus may transmit data on the determined first set of tone indices associated with the at least one allocated resource block. For example, referring to FIG. 2, the STA 212 may transmit data on the determined set of physical tone indices associated with the resource block.

At block 1320, the apparatus may receive a plurality of data packets from a second wireless device over a first set of tone indices associated with a resource block. Each data packet of the plurality of data packets may be received over a tone index of the first set of tone indices.

At block 1325, the apparatus may determine a second set of tone indices associated with the resource block based on the first set of tone indices. The first set of tone indices may be a set of physical tone indices that is logically mapped to the second set of tone indices that is a set of nominal tone indices.

At block 1330, the apparatus may reorder the received plurality of data packets based on the second set of tone indices.

For example, referring to FIGS. 2 and 6, using a truncated bit reversal example, the STA 212 may receive a plurality of data packets from the AP 202 over a first set of physical tone indices 2, 6, 1 5, 7. Each of the data packets may be received over a tone index (e.g., tone index 2). The STA 212 may determine a set of nominal tone indices associated with the resource block. The set of physical tone indices may be logically mapped to the set of nominal tone indices. Having determined the set of nominal tone indices, the STA 212 may reorder or rearrange the data packets into the proper order intended by the AP 202. In this example, physical tone index 1 may have data packet 3. Physical tone index 2 may have data packet 1. Physical tone index 5 may have data packet 4. Physical tone index 6 may have data packet 2. And physical tone index 7 may have data packet 5. If the data packets were arranged according to the physical tone indices on which the data packets were sent, the order for the data packets would be data packets 3, 1, 4, 2, 5. As such the data packets would be out of order for decoding. By de-mapping to recover the set of nominal tone indices to which the set of physical tone indices is mapped, data packet 1 will be associated with nominal tone index 1, data packet 2 will be associated with nominal tone index 2, data packet 3 will be associated with nominal tone index 5, data packet 4 will be associated with nominal tone index 6, and data packet 5 will be associated with nominal tone index 7. Thus, if the data packets were arranged according to the nominal tone indices 1, 2, 5, 6, 7, the data packets would be in the order of data packet 1, 2, 3, 4, 5, which can be properly decoded.

Figure 14:
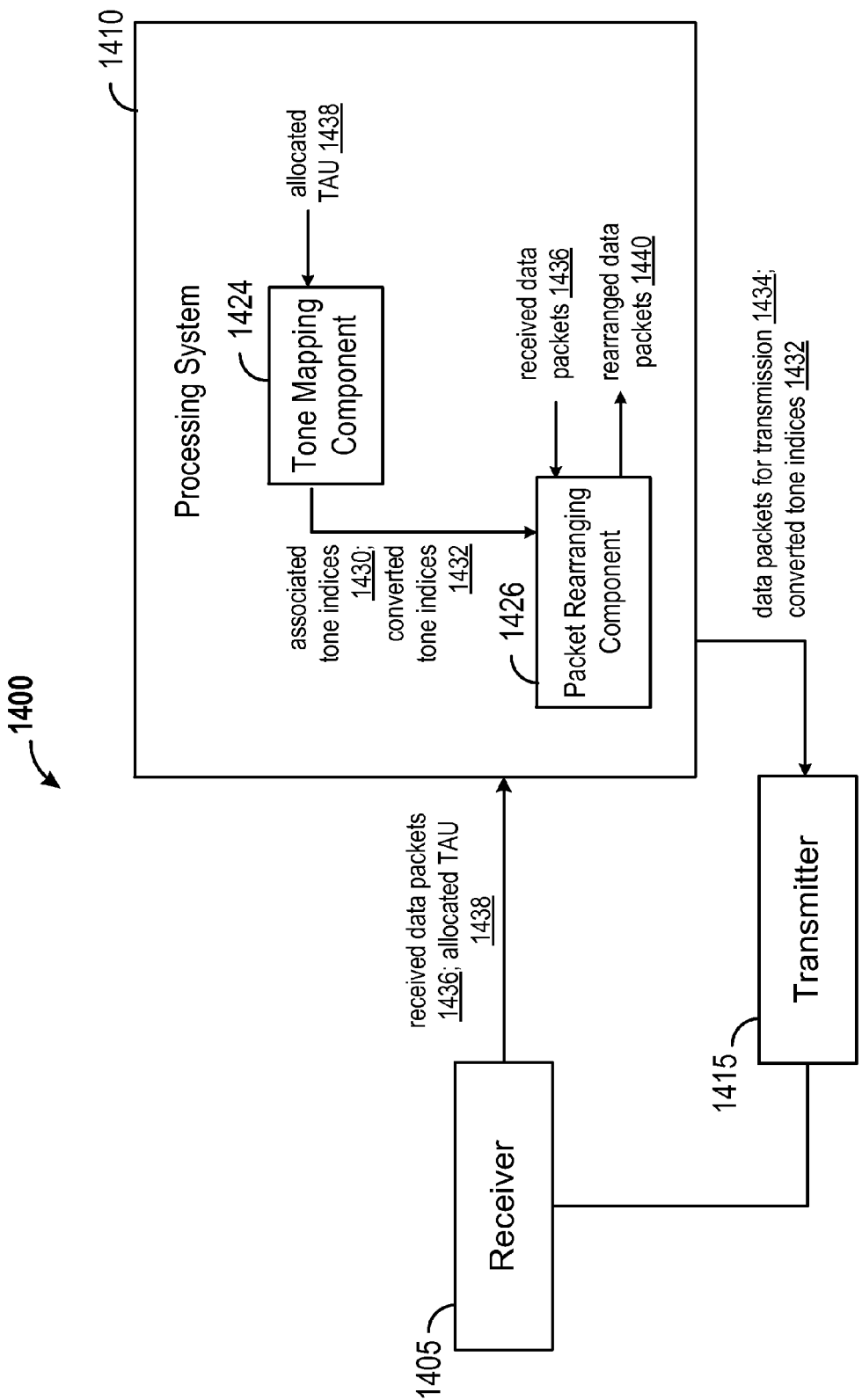
FIG. 14 is a functional block diagram of an exemplary wireless communication device for transmitting on tone mapped resource blocks.

FIG. 14 is a functional block diagram of an exemplary wireless communication device 1400 for transmitting on tone mapped resource blocks. The wireless communication device 1400 may include a receiver 1405, a processing system 1410, and a transmitter 1415. The processing system 1410 may include a tone mapping component 1424 and/or a packet rearranging component 1426. The processing system 1410, the tone mapping component 1424, and/or the receiver 1405 may be configured to receiving allocation information related to at least one allocated resource block. The processing system 1410 and/or the tone mapping component 1424 may be configured to determine a first set of tone indices (e.g., converted tone indices 1432) associated with the at least one allocated resource block (e.g., an allocated TAU 1438) based on the received allocation information. The first set of tone indices may be a function of a second set of tone indices (e.g., associated tone indices 1430) associated with the at least one allocated resource block. The first set of tone indices may be a set of physical tone indices, and the second set of tone indices may be a set of nominal tone indices. The processing system 1410, the tone mapping component 1424, and/or the transmitter 1415 may be configure to transmit data (e.g., data packets for transmission 1434) on the determined first set of tone indices associated with the at least one allocated resource block. In an aspect, the allocation information may include the second set of tone indices. In this aspect, the processing system 1410 and/or the tone mapping component 1424 may be configured to determine the first set of tone indices by comparing each tone index in the second set of tone indices with a mapping table, in which the mapping table indicates which tone index from the first set of tone indices corresponds to each tone index in the second set of tone indices, and by identifying a tone index from the first set of tone indices that corresponds to each tone index in the second set of tone indices. In another aspect, the allocation information may include at least one identifier, and the at least one identifier may be associated with the at least one allocated resource block. In this aspect, the processing system 1410 and/or the tone mapping component 1424 may be configured to determine the first set of tone indices by determining the first set of tone indices as a function of the at least one identifier. In another configuration, the processing system 1410 and/or the tone mapping component 1424 may be configured to determine the first set of tone indices by determining an interleaver matrix according to a bandwidth size and by determining the first set of tone indices based on the interleaver matrix and the at least one identifier. In another configuration, the processing system 1410 and/or the tone mapping component 1424 may be configured to receive a plurality of data packets (e.g., received data packets 1436) from a wireless device over a third set of tone indices associated with a second resource block, in which each data packet of the plurality of data packets is received over a tone index of the third set of tone indices, and to determine a fourth set of tone indices associated with the second resource block based on the third set of tone indices, in which the third set of tone indices is a set of physical tone indices that is logically mapped to the fourth set of tone indices that is a set of nominal tone indices. In another configuration, the processing system 1410, the tone mapping component 1424, and/or the packet rearranging component 1426 may be configured to reorder the received plurality of data packets based on the fourth set of tone indices (e.g., to generate rearranged data packets 1440). In this configuration, the processing system 1410, the tone mapping component 1424, and/or the packet rearranging component 1426 may be configured to reorder by determining a tone index in the third set of tone indices on which each data packet of the plurality of data packets was received, by determining a corresponding tone index in the fourth set of tone indices for each tone index on which each data packet of the plurality of data packets was received, and by rearranging the plurality of data packets based an order of each corresponding tone index in the fourth set of tone indices. In another configuration, the processing system 1410 and/or the tone mapping component 1424 may be configured to determine the fourth set of tone indices by determining a fifth set of tone indices based on the third set of tone indices and by comparing the fifth set of tone indices with a mapping table, in which the mapping table maps the fifth set of tone indices to the fourth set of tone indices. In another aspect, the fourth set of tone indices may be determined based on an interleaver matrix function and the third set of tone indices. In another configuration, the processing system 1410 and/or the tone mapping component 1424 may be configured to determine the fourth set of tone indices, for each tone index in the third set of tone indices, by determining an index position of a corresponding tone index in the fourth set of tone indices, by subtracting the index position by an offset value, and by dividing the difference by a scaling factor.

The receiver 1405, the processing system 1410, the tone mapping component 1424, the packet rearranging component 1426, and/or the transmitter 1415 may be configured to perform one or more functions discussed above with respect to blocks 1305, 1310, 1315, 1320, 1325, and 1330 of FIG. 13. The receiver 1405 may correspond to the receiver 1212. The processing system 1410 may correspond to the processor 1204. The transmitter 1415 may correspond to the transmitter 1210. The tone mapping component 1224 may correspond to the tone mapping component 126 and/or the tone mapping component 1224.

Moreover, means for receiving allocation information related to at least one allocated resource block may comprise the processing system 1410, the tone mapping component 1424, and/or the receiver 1405. Means for determining a first set of tone indices associated with the at least one allocated resource block based on the received allocation information may comprise the processing system 1410 and/or the tone mapping component 1424. Means for transmitting data on the determined first set of tone indices associated with the at least one allocated resource block may comprise the processing system 1410, the tone mapping component 1424, and/or the transmitter 1415. Means for receiving a plurality of data packets may comprise the processing system 1410, the tone mapping component 1424, and/or the receiver 1405. Means for determining a fourth set of tone indices may comprise the processing system 1410 and/or the tone mapping component 1424. Means for reordering may comprise the processing system 1410, the packet rearranging component 1426, and/or the tone mapping component 1424.

The various operations of methods described above may be performed by any suitable means capable of performing the operations, such as various hardware and/or software component(s), circuits, and/or module(s). Generally, any operations illustrated in the Figures may be performed by corresponding functional means capable of performing the operations.

The various illustrative logical blocks, components and circuits described in connection with the present disclosure may be implemented or performed with a general purpose processor, a DSP, an application specific integrated circuit (ASIC), an FPGA or other PLD, discrete gate or transistor logic, discrete hardware components or any combination thereof designed to perform the functions described herein. A general purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

In one or more aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, compact disk (CD) ROM (CD-ROM) or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, digital versatile disc (DVD), floppy disk and Blu-ray disc where disks usually reproduce data magnetically, while discs reproduce data optically with lasers. Thus, computer readable medium comprises non-transitory computer readable medium (e.g., tangible media).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

Thus, certain aspects may comprise a computer program product for performing the operations presented herein. For example, such a computer program product may comprise a computer readable medium having instructions stored (and/or encoded) thereon, the instructions being executable by one or more processors to perform the operations described herein. For certain aspects, the computer program product may include packaging material.

Further, it should be appreciated that components and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a CD or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

While the foregoing is directed to aspects of the present disclosure, other and further aspects of the disclosure may be devised without departing from the basic scope thereof, and the scope thereof is determined by the claims that follow.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112(f), unless the element is expressly recited using the phrase "means for" or, in the case of a method claim, the element is recited using the phrase "step for."

What is claimed is:

1. A method of wireless communication for an access point, comprising:
    allocating a plurality of resource blocks for wireless communication; and
    transmitting data on a first resource block of the plurality of resource blocks, wherein the first resource block is associated with a first set of tone indices and a second set of tone indices, and the first set of tone indices is a set of nominal tone indices that is logically mapped to a second set of tone indices that is a set of physical tone indices,
    wherein the second set of tone indices is based on a mapping by an interleaver matrix function of the first set of tone indices, and wherein an input into the interleaver matrix function is the first set of tone indices.

2. The method of claim 1, further comprising:
    transmitting allocation information related to a second resource block, wherein the second resource block is associated with a third set of tone indices and a fourth set of tone indices, and the third set of tone indices is a set of nominal tone indices that is logically mapped to the fourth set of tone indices that is a set of physical tone indices, and
    wherein the allocation information comprises at least one of the third set of tone indices, an identifier, a resource block size, or the fourth set of tone indices.

3. A method of wireless communication for an access point, comprising:
    allocating a plurality of resource blocks for wireless communication; and
    transmitting data on a first resource block of the plurality of resource blocks, wherein the first resource block is associated with a first set of tone indices and a second set of tone indices, and the first set of tone indices is a set of nominal tone indices that is logically mapped to a second set of tone indices that is a set of physical tone indices,
    wherein each tone index in the first set of tone indices is mapped to a corresponding tone index in the second set of tone indices based on an equation, $f(x)=i*D_m+k$, wherein i is a local tone index associated with the first resource block, $D_m$ is a scaling factor, k is a resource block number associated with the first resource block, and f(x) is an index position related to the first set of tone indices, and
    wherein the corresponding tone index in the second set of tone indices corresponds to a tone index in the first set of tone indices having the index position of f(x).

4. The method of claim 3, wherein when f(x) is greater than a MaxToneIndex, the MaxToneIndex representing a maximum distributed tone index, f(x) is determined by a second equation, mod(f(x),MaxToneIndex), and the corresponding tone index in the second set of tone indices corresponds to a tone index in the first set of tone indices having the index position equal to mod(f(x),MaxToneIndex).

5. A method of wireless communication for an access point, comprising:
    allocating a plurality of resource blocks for wireless communication;
    transmitting data on a first resource block of the plurality of resource blocks, wherein the first resource block is associated with a first set of tone indices and a second set of tone indices, and the first set of tone indices is a set of nominal tone indices that is logically mapped to a second set of tone indices that is a set of physical tone indices;

receiving a plurality of data packets from a wireless device over a third set of tone indices associated with a second resource block, wherein each data packet of the plurality of data packets is received over a tone index of the third set of tone indices; and determining a fourth set of tone indices associated with the second resource block based on the third set of tone indices, wherein the third set of tone indices is a set of physical tone indices that is logically mapped to the fourth set of tone indices that is a set of nominal tone indices.

6. The method of claim 5, furthering comprising reordering the received plurality of data packets based on the fourth set of tone indices.

7. The method of claim 6, wherein the reordering comprises:

determining a tone index in the third set of tone indices on which each data packet of the plurality of data packets was received;

determining a corresponding tone index in the fourth set of tone indices for each tone index on which each data packet of the plurality of data packets was received; and rearranging the plurality of data packets based an order of each corresponding tone index in the fourth set of tone indices.

8. The method of claim 5, wherein the determining the fourth set of tone indices comprises:

determining a fifth set of tone indices based on the third set of tone indices; and comparing the fifth set of tone indices with a mapping table, wherein the mapping table maps the fifth set of tone indices to the fourth set of tone indices.

9. The method of claim 5, wherein the fourth set of tone indices is determined based on an interleaver matrix function and the third set of tone indices.

10. The method of claim 5, wherein the determining the fourth set of tone indices comprises:

for each tone index in the third set of tone indices, determining an index position of a corresponding tone index in the fourth set of tone indices;

subtracting the index position by an offset value; and dividing the difference by a scaling factor.

11. A method of wireless communication for a station, comprising:

receiving allocation information related to at least one allocated resource block, the allocation information comprises at least one identifier which is associated with the at least one allocated resource block;

determining a first set of tone indices associated with the at least one allocated resource block based on the received allocation information, wherein the first set of tone indices is a function of a second set of tone indices associated with the at least one allocated resource block, and the first set of tone indices is a set of physical tone indices and the second set of tone indices is a set of nominal tone indices; and transmitting data on the determined first set of tone indices associated with the at least one allocated resource block, wherein the determining the first set of tone indices further comprises:

determining an interleaver matrix according to a bandwidth size; and determining the first set of tone indices based on the interleaver matrix and the at least one identifier.

12. The method of claim 11, wherein the allocation information comprises the second set of tone indices, and wherein the determining the first set of tone indices comprises:

comparing each tone index in the second set of tone indices with a mapping table, wherein the mapping table indicates which tone index from the first set of tone indices corresponds to each tone index in the second set of tone indices; and identifying a tone index from the first set of tone indices that corresponds to each tone index in the second set of tone indices.

13. A method of wireless communication for a station, comprising:

receiving allocation information related to at least one allocated resource block;

determining a first set of tone indices associated with the at least one allocated resource block based on the received allocation information, wherein the first set of tone indices is a function of a second set of tone indices associated with the at least one allocated resource block, and the first set of tone indices is a set of physical tone indices and the second set of tone indices is a set of nominal tone indices;

transmitting data on the determined first set of tone indices associated with the at least one allocated resource block;

receiving a plurality of data packets from a wireless device over a third set of tone indices associated with a second resource block, wherein each data packet of the plurality of data packets is received over a tone index of the third set of tone indices; and determining a fourth set of tone indices associated with the second resource block based on the third set of tone indices, wherein the third set of tone indices is a set of physical tone indices that is logically mapped to the fourth set of tone indices that is a set of nominal tone indices.

14. The method of claim 13, furthering comprising reordering the received plurality of data packets based on the fourth set of tone indices.

15. The method of claim 14, wherein the reordering comprises:

determining a tone index in the third set of tone indices on which each data packet of the plurality of data packets was received;

determining a corresponding tone index in the fourth set of tone indices for each tone index on which each data packet of the plurality of data packets was received; and rearranging the plurality of data packets based an order of each corresponding tone index in the fourth set of tone indices.

16. The method of claim 13, wherein the determining the fourth set of tone indices comprises:

determining a fifth set of tone indices based on the third set of tone indices; and comparing the fifth set of tone indices with a mapping table, wherein the mapping table maps the fifth set of tone indices to the fourth set of tone indices.

17. The method of claim 13, wherein the fourth set of tone indices is determined based on an interleaver matrix function and the third set of tone indices.

18. The method of claim 13, wherein the determining the fourth set of tone indices comprises:
for each tone index in the third set of tone indices, determining an index position of a corresponding tone index in the fourth set of tone indices;
subtracting the index position by an offset value; and
dividing the difference by a scaling factor.

19. An apparatus for wireless communication, comprising:
a memory; and
at least one processor coupled to the memory and configured to:
allocate a plurality of resource blocks for wireless communication; and
transmit data on a first resource block of the plurality of resource blocks, wherein the first resource block is associated with a first set of tone indices and a second set of tone indices, and the first set of tone indices is a set of nominal tone indices that is logically mapped to a second set of tone indices that is a set of physical tone indices,
wherein the second set of tone indices is based on a mapping by an interleaver matrix function of the first set of tone indices, and wherein an input into the interleaver matrix function is the first set of tone indices.

20. The apparatus of claim 19, wherein the at least one processor is further configured to:
transmit allocation information related to a second resource block, wherein the second resource block is associated with a third set of tone indices and a fourth set of tone indices, and the third set of tone indices is a set of nominal tone indices that is logically mapped to the fourth set of tone indices that is a set of physical tone indices, and
wherein the allocation information comprises at least one of the third set of tone indices, an identifier, a resource block size, or the fourth set of tone indices.

21. An apparatus for wireless communication, comprising:
a memory; and
at least one processor coupled to the memory and configured to:
allocate a plurality of resource blocks for wireless communication;
transmit data on a first resource block of the plurality of resource blocks, wherein the first resource block is associated with a first set of tone indices and a second set of tone indices, and the first set of tone indices is a set of nominal tone indices that is logically mapped to a second set of tone indices that is a set of physical tone indices;
receive a plurality of data packets from a wireless device over a third set of tone indices associated with a second resource block, wherein each data packet of the plurality of data packets is received over a tone index of the third set of tone indices; and
determine a fourth set of tone indices associated with the second resource block based on the third set of tone indices, wherein the third set of tone indices is a set of physical tone indices that is logically mapped to the fourth set of tone indices that is a set of nominal tone indices.

22. The apparatus of claim 21, wherein the at least one processor is further configured to reorder the received plurality of data packets based on the fourth set of tone indices.

23. The apparatus of claim 22, wherein the at least one processor is configured to reorder by:
determining a tone index in the third set of tone indices on which each data packet of the plurality of data packets was received;
determining a corresponding tone index in the fourth set of tone indices for each tone index on which each data packet of the plurality of data packets was received; and
rearranging the plurality of data packets based an order of each corresponding tone index in the fourth set of tone indices.

24. An apparatus for wireless communication, comprising:
a memory; and
at least one processor coupled to the memory and configured to:
receive allocation information related to at least one allocated resource block, the allocation information comprises at least one identifier which is associated with the at least one allocated resource block;
determine a first set of tone indices associated with the at least one allocated resource block based on the received allocation information, wherein the first set of tone indices is a function of a second set of tone indices associated with the at least one allocated resource block, and the first set of tone indices is a set of physical tone indices and the second set of tone indices is a set of nominal tone indices; and
transmit data on the determined first set of tone indices associated with the at least one allocated resource block,
wherein to determine the first set of tone indices, the at least one processor is configured to:
determine an interleaver matrix according to a bandwidth size; and
determine the first set of tone indices based on the interleaver matrix and at least one identifier.

25. The apparatus of claim 24, wherein the allocation information comprises the second set of tone indices, and wherein the at least one processor is configured to determine the first set of tone indices by:
comparing each tone index in the second set of tone indices with a mapping table, wherein the mapping table indicates which tone index from the first set of tone indices corresponds to each tone index in the second set of tone indices; and
identifying a tone index from the first set of tone indices that corresponds to each tone index in the second set of tone indices.

26. The apparatus of claim 24, wherein the allocation information comprises the at least one identifier, the at least one identifier being associated with the at least one allocated resource block, and wherein the determining the first set of tone indices comprises determining the first set of tone indices as a function of the at least one identifier.

* * * * *